United States Patent
Shin et al.

(10) Patent No.: US 8,359,525 B2
(45) Date of Patent: Jan. 22, 2013

(54) METHOD AND APPARATUS FOR TRANSMITTING DATA IN OPTICAL TRANSPORT NETWORK

(75) Inventors: Jong-Yoon Shin, Daejeon (KR); Jongho Kim, Daejeon (KR); Je Soo Ko, Daejeon (KR); Kwangjoon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 501 days.

(21) Appl. No.: 12/718,495

(22) Filed: Mar. 5, 2010

(65) Prior Publication Data

US 2010/0229074 A1 Sep. 9, 2010

(30) Foreign Application Priority Data

Mar. 6, 2009 (KR) ......... 10-2009-0019465
Sep. 17, 2009 (KR) ......... 10-2009-0088141
Mar. 5, 2010 (KR) ......... 10-2010-0019878

(51) Int. Cl.
*H03M 13/00* (2006.01)

(52) U.S. Cl. .................. 714/776; 370/470
(58) Field of Classification Search .......... 370/241, 370/441, 465, 470; 398/5, 27; 714/786, 714/776
See application file for complete search history.

(56) References Cited

U.S. PATENT DOCUMENTS

| | | | | |
|---|---|---|---|---|
| 5,373,502 | A * | 12/1994 | Turban | 370/441 |
| 6,968,130 | B1 * | 11/2005 | Pan | 398/5 |
| 6,970,428 | B1 * | 11/2005 | Kobayashi | 370/241 |
| 7,043,162 | B2 | 5/2006 | Kubo et al. | |
| 7,551,640 | B1 * | 6/2009 | Klecka et al. | 370/465 |
| 7,779,336 | B2 * | 8/2010 | Wenger et al. | 714/776 |
| 7,957,642 | B2 * | 6/2011 | Loprieno | 398/27 |

OTHER PUBLICATIONS

ETRI; "Proposal for mapping of client signals over LO OPU4", International Telecommunications Union, Sep. 28, 2009, pp. 1-10.
ETRI; "Alternatives of FEC Redundancy ratio for OTU4", International Telecommunication Union, Mar. 17, 2009, pp. 1-3.
ETRI; "ODU4 FS Bytes", International Telecommunication Union, Mar. 17, 2009, pp. 1-4.

* cited by examiner

*Primary Examiner* — David Ton
(74) *Attorney, Agent, or Firm* — Ladas & Parry LLP

(57) ABSTRACT

A method of transmitting data in an optical transport network is provided. The method comprises generating an optical transmission unit frame including an in-band area including a first area to which information data is allocated and a second area to which the information data is not allocated and an out-band area including parity information and transmitting the data through the optical transmission unit frame.

20 Claims, 22 Drawing Sheets

| Column<br>Row | 15 | 16 | 17 | 18 | 19 | 20 | ... | 3816 3817 3824<br>FS or FEC parity Bytes (4 × 8 bytes) |
|---|---|---|---|---|---|---|---|---|
| 1 | PS1 | SC1 | 1 | 2 | 3 | 4 | ... | 38000 |
| 2 | PS2 | SC2 | 38001 | 38002 | 38003 | 38004 | ... | 76000 |
| 3 | PS3 | SC3 | 76001 | 76002 | 76003 | 76004 | ... | 114000 |
| 4 | PS4 | PS4 | 114001 | 114002 | 114003 | 114004 | ... | 152000 |

FIG. 11

METHOD AND APPARATUS FOR TRANSMITTING DATA IN OPTICAL TRANSPORT NETWORK

CROSS-REFERENCE TO RELATED APPLICATION

This application claims priority to and the benefit of Korean Patent Application No. 10-2009-0019465, 10-2009-0088141 and 10-2010-0019878 filed in the Korean Intellectual Property Office on Mar. 6, 2009, Sep. 17, 2009 and Mar. 5, 2010, the entire contents of which are incorporated herein by reference.

BACKGROUND OF THE INVENTION (a) Field of the Invention

The present invention relates to an optical transport network, and more particularly, to a method and an apparatus for transmitting data to improve an error correction capability in the optical transport network.

(b) Description of the Related Art

In an optical transport network, forward error correcting (hereinafter, referred to as 'FEC') is performed in order to improve a transmission performance. ITU-T G.709 defines an optical channel transport unit (OTUk) and an optical channel data unit (ODUk) (k=1, 2, 3) in order to stably transmit a high-speed signal providing a large bandwidth in the optical transport network. One OTUk includes the ODUk corresponding to information data including an overhead and a payload (optical channel payload unit (OPUk)) and parity bytes for error correction of the ODUk.

Meanwhile, OTU1 has a bit rate of approximately 2.666 Gbit/s, OTU2 has a bit rate of approximately 10.709 Gbit/s, OTU3 has a bit rate of approximately 43.018 Gbit/s, and OTU4 has a bit rate of approximately 111.8 Gbit/s.

As such, when OTU4 transmits an optical signal of 100 Gbit/s or more, OTU4 has a transmission penalty higher than the existing OTUk (k=1, 2, 3). Therefore, definition of an error correction code having a performance higher than an error correction code of 4×256 bytes defined for error correction in the existing OTUk is required. More parity bits are required in order to improve the performance of the error correction code. Herein, when more parity bits are granted to the same information data, the bit rate further increases. That is, when the performance of the error correction code is improved as a transmission rate increases, the transmission rate further increases, thereby deteriorating the transmission performance.

SUMMARY OF THE INVENTION

The present invention has been made in an effort to provide a frame structure having an advantage of maintaining or improving an error correction capability although a transmission rate increases in an optical transport network.

An exemplary embodiment of the present invention provides a method of a transmitting apparatus's transmitting data in an optical transport network that comprises: generating an optical transmission unit frame including an in-band area including a first area to which information data is allocated and a second area to which the information data is not allocated and an out-band area including parity information and transmitting the data through the optical transmission unit frame.

Another embodiment of the present invention provides a method of a receiving apparatus's receiving data in an optical transport network that comprises: generating an optical transmission unit frame including an in-band area including a first area including information data and a second area to which the information data is not allocated and an out-band area including parity information; and performing an error correction of the information data by using the parity information included in the out-band area.

Yet another embodiment of the present invention provides a transmitting apparatus in an optical transport network that comprises: a frame generator generating an optical transmission unit frame including an in-band area including a first area to which information data is allocated and a second area to which the information data is not allocated and an out-band area including parity information; a mapper mapping the information data to the first area; and a transmitter transmitting the information data mapped by the mapper.

Even when a transmission rate is 100 Gbit/s or more in an optical transport network, a frame structure capable of maintaining or improving an error correction capability can be acquired. In addition, the error correction capability can be further improved by adjusting a code length in an FEC structure. A plurality of tributary signals and a signal of approximately 100 Gbit/s can be transmitted using the frame structure disclosed in the present invention.

BRIEF DESCRIPTION OF THE DRAWINGS

FIGS. 4 to 7 are diagrams illustrating an FEC structure of OTU4 shown in FIG. 3;

FIG. 8 is a diagram illustrating a method of mapping a tributary signal by using a frame structure shown in FIG. 3;

FIG. 10 illustrates another method of mapping a 100G Ethernet signal by using a frame structure shown in FIG. 3;

FIG. 11 illustrates yet another method of mapping a 100G Ethernet signal by using a frame structure shown in FIG. 3;

DETAILED DESCRIPTION OF THE EMBODIMENTS

Figure 1:
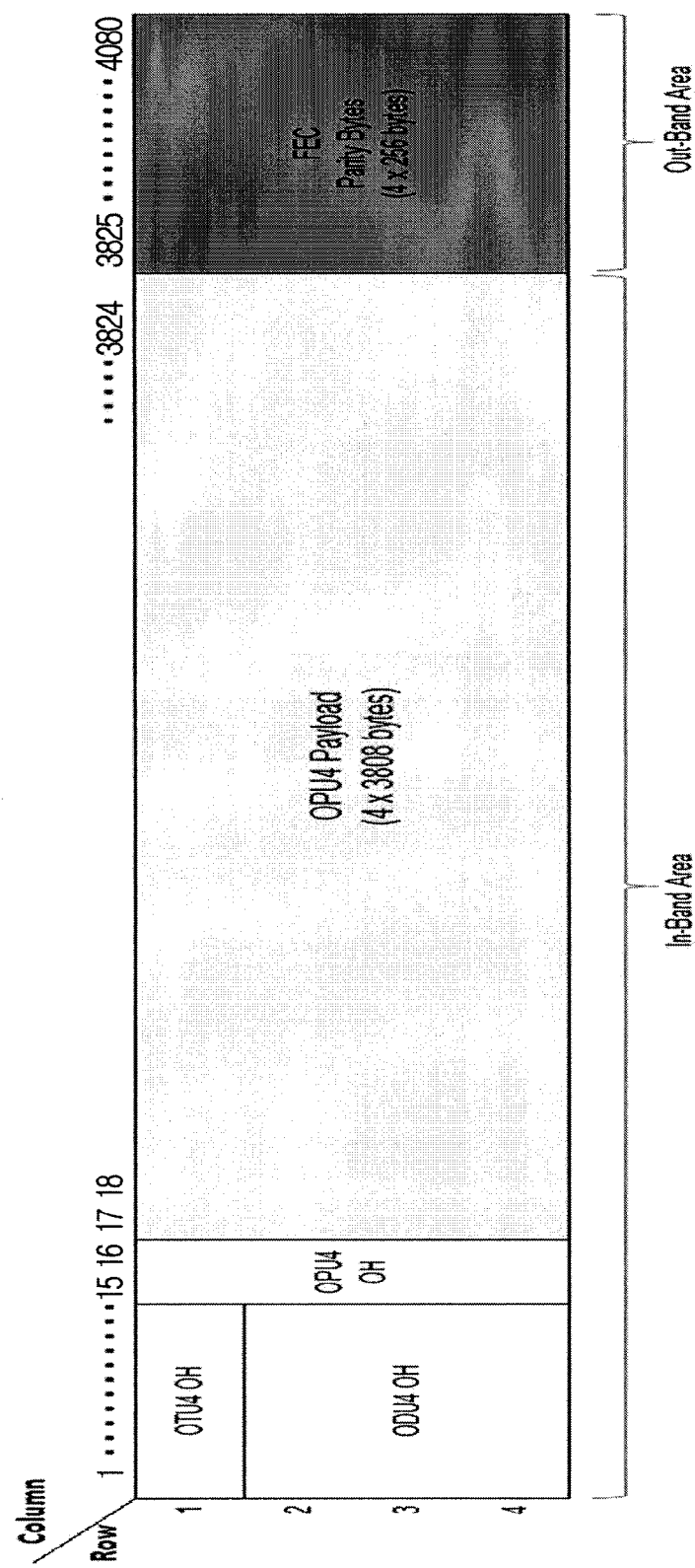
FIG. 1 illustrates the structure of OTUk (k=1, 2, 3)

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising", will be understood to imply the inclusion of stated elements but not the exclusion of any other elements.

FIG. 1 illustrates a structure of OTUk (k=1, 2, 3).

Referring to FIG. 1, OTUk includes ODUk (1-byte column to 3824-byte column) and an FEC area (3825-byte column to 4080-byte column). The FEC area as an area for error correction includes 4×256 parity bytes. ODUk includes overheads OTUk OH, ODUk OH, and OPUk OH and a payload OPUk. In this specification, information data is allocated to an area constituted by the overhead and the payload. Hereinafter, the area (1-byte column to 3824-byte column) corresponding to ODUk is referred to as an in-band area and the FEC area (3825-byte column to 4080-byte column) is referred to as an out-band area.

Figure 2:
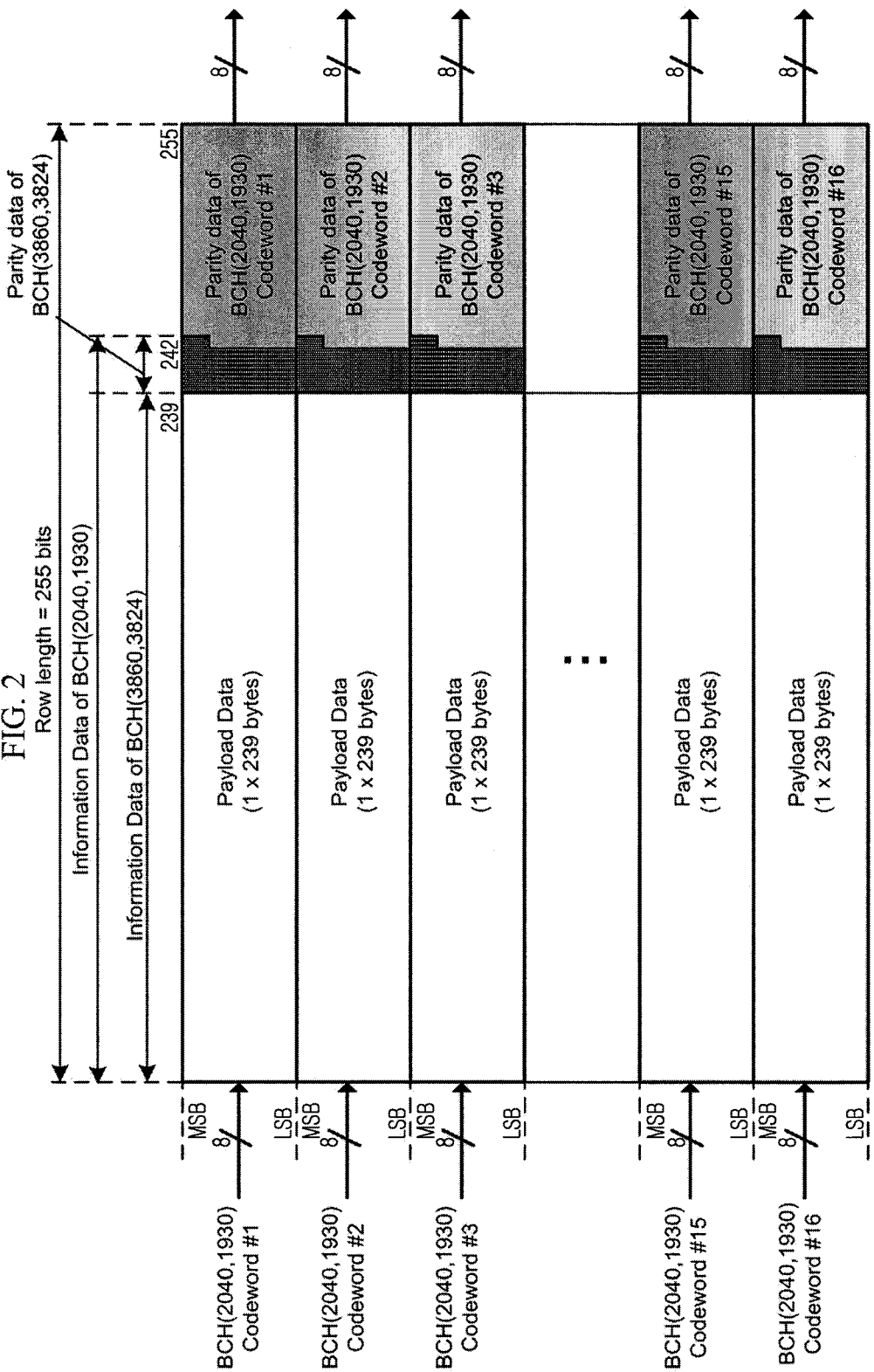
FIG. 2 illustrates one example of an FEC structure defined in OTUk (k=1, 2, 3)

FIG. 2 illustrates one example of an FEC structure defined in OTUk (k=1, 2, 3).

Referring to FIG. 2, in order to generate parity information for FEC with respect to information data of one row of OTUk, a BCH encoder may be used. $BCH(a,b)_c$ is a cycle code for error correction. BCH represents initial alphabets of three discoverers of Bose, Chaudhuri, Hocque-nghem. Herein, a represents a length of BCH-coded information data, b represents a length of information data inputted into the BCH encoder, and c represents an unit (i.e., byte or bit) of the length. The coded information data may be called a codeword. Therefore, parity information of a-b is added through BCH(a,b).

First, when eight $BCH(3860,3824)_{byte}$ encoders are used with respect to information data of 3824(16×239) bytes, parity data of 8×36 bits may be generated. Next, when sixteen $BCH(2040,1930)_{bit}$ encoders are used with respect to 3860 bytes outputted from the $BCH(3860,3824)_{byte}$ encoder, parity data of 16×110 bits may be generated. Therefore, one row of OTUk includes total 4080 bytes including the FEC area and when this is constituted by four rows, the OTUk (k=1, 2, 3) frame structure shown in FIG. 1 is maintained.

Meanwhile, OTU4 of 100 Gbit/s has a transmission rate higher than OTUk (k=1, 2, 3) and a high transmission penalty. Accordingly, FEC having a performance higher than the FEC defined in OTUk (k=1, 2, 3) is required for error correction. However, since FEC needs more parity information to have a high performance, more parity information should be defined in the out-band area with respect to the same information data. Therefore, the transmission rate of OTU4 should be further increased. That is, as the transmission rate increases, the FEC performance should be further increased. When the FEC performance is increased, the transmission rate is further increased, thereby deteriorating the transmission performance. In order to solve the problem, a method not to allocate the information data to a part of the in-band area may be considered. A remained part of the in-band area to which the information data is not allocated may be set as the fixed stuff FS or an additional parity byte for the FEC. Hereinafter, a frame structure having an error correction performance suitable for the transmission rate of OTU4 will be described.

Figure 3:
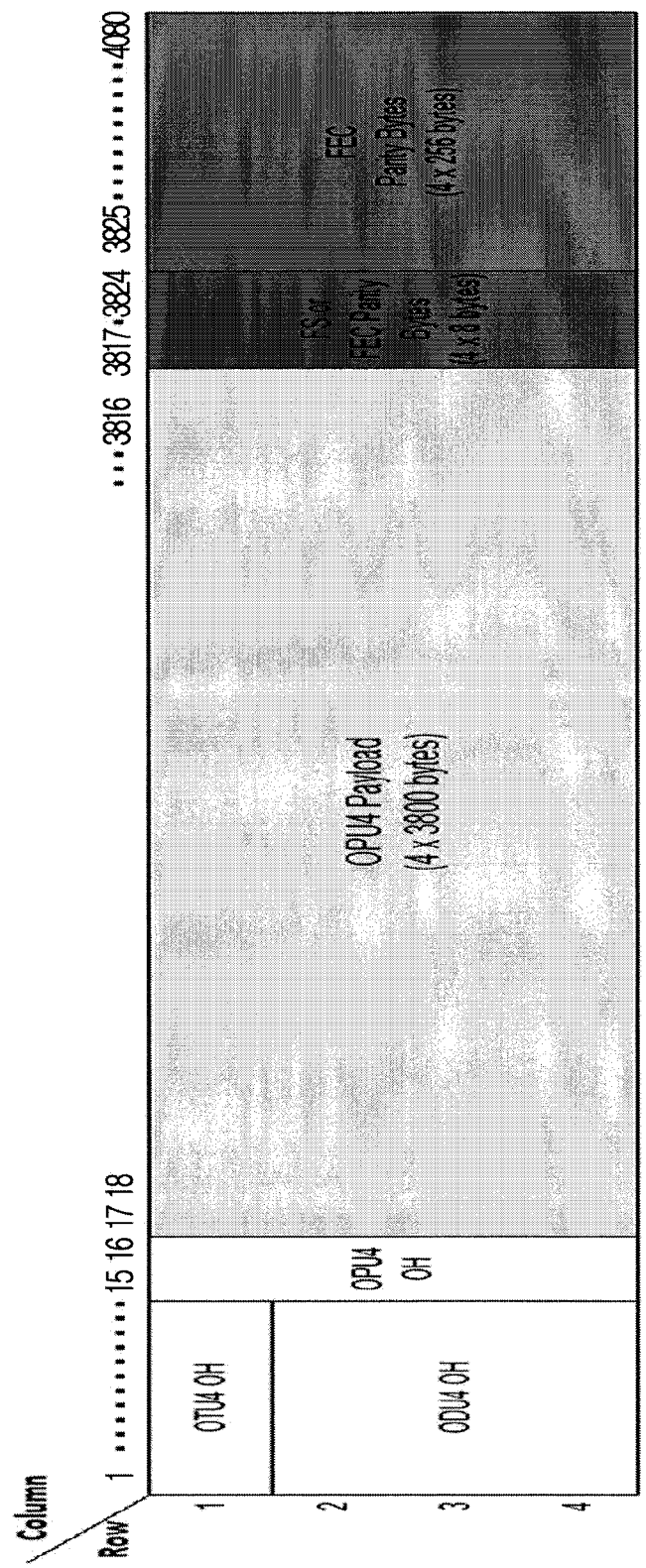
FIG. 3 illustrates the structure of a frame (e.g., OTU4) according to an exemplary embodiment of the present invention.

FIG. 3 illustrates a structure of a frame (e.g., OTU4) according to an exemplary embodiment of the present invention.

Referring to FIG. 3, OTU4 includes ODU4 to which the information data is allocated and an FEC area. Herein, the information data is not allocated to a part of ODU 4, that is, a part of the in-band area. The part of the in-band area to which the information data is not allocated may be set as a fixed stuff FS or additional parity bytes for the FEC. That is, unlike the structure of OTUk (k=1, 2, 3) shown in FIG. 1, OPU4 which is a payload is defined up to the 3816-byte column and the FEC area is defined up to the 3825-byte column to 4080-byte column and the additional parity bytes for the fixed stuff or the FEC is defined between OPU4 and the area for the FEC. Hereinafter, for convenience of a description, the additional parity bytes for the fixed stuff or the FEC defined between OPU4 and the area for the FEC is referred to as an FS area. Meanwhile, in FIG. 3, the FS area occupies an 8-byte column is shown, but is not limited thereto.

When the FS area is used as the fixed stuff, the FEC area shown in FIG. 3 is the same as the FEC area of OTUk (k=1, 2, 3), but the information data of OTUk (k=1, 2, 3) decreases, thereby improving the error correction performance. In addition, when the FS area is used as the additional parity information for the FEC, the error correction performance may be improved while the transmission rate of the entire OTU4 is not increased any longer.

FIGS. 4 to 7 are diagrams illustrating an FEC structure of OTU4 shown in FIG. 3. In order to generate parity information for the FEC with respect to information data of one row of OTU4, a case in which a BCH encoder is used is shown. One row of OTU4 shown in each figure includes total 4080 bytes including an FEC area and when this is constituted by four rows, the OTU4 frame structure shown in FIG. 2 is maintained.

Figure 4:
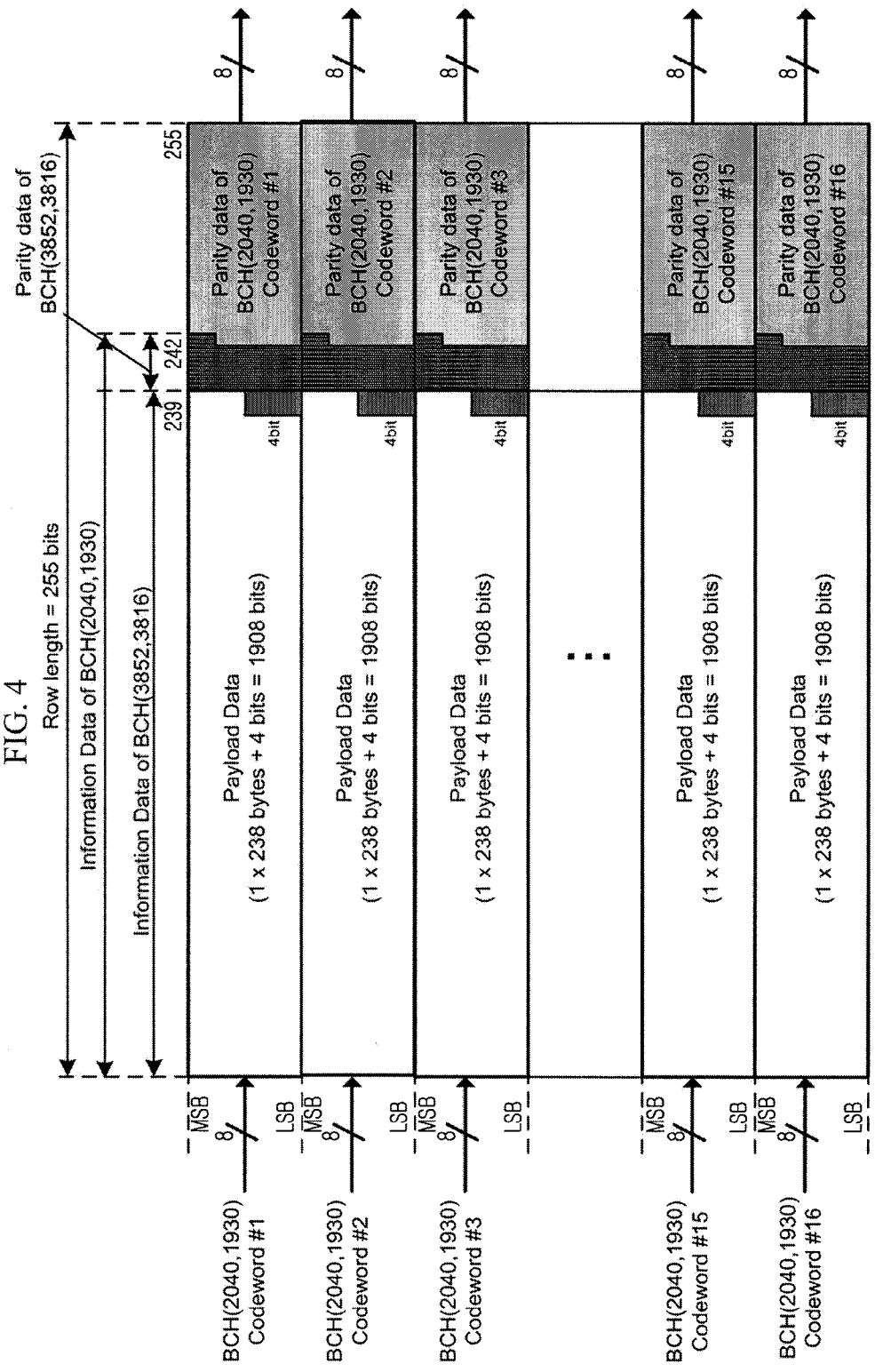

Referring to FIG. 4, sixteen 4-bits (total 8 bytes) displayed on a 239-byte column are the FS area shown in FIG. 3. First, when eight BCH(3852,3816) byte encoders are used with respect to information data of 3816(16×239-8) bytes, parity data of 8×36 bits may be generated. Next, 3860 bytes are generated by adding 8 bytes which are the FS area with respect to 3852 bytes outputted from the $BCH(3852,3816)_{byte}$ encoder. Next, when sixteen $BCH(2040,1930)_{bit}$ encoders are used with respect to 3860 bytes, parity data of 16×110 bits may be generated.

The $BCH(3852,3816)_{byte}$ encoder can correct an error of maximum 3 bits like the $BCH(3860,3824)_{byte}$ encoder shown in FIG. 2. However, $BCH(3860,3824)_{byte}$ encoder corrects the error of 3 bits among 3860 bits, but the $BCH(3852,3816)_{byte}$ encoder corrects the error of 3 bits among 3852 bits. Therefore, the $BCH(3852,3816)_{byte}$ encoder has the higher error correction performance. That is, it is possible to improve the error correction performance by applying the $BCH(3852,3816)_{byte}$ encoder to the in-band area excluding the FS area.

Figure 5:
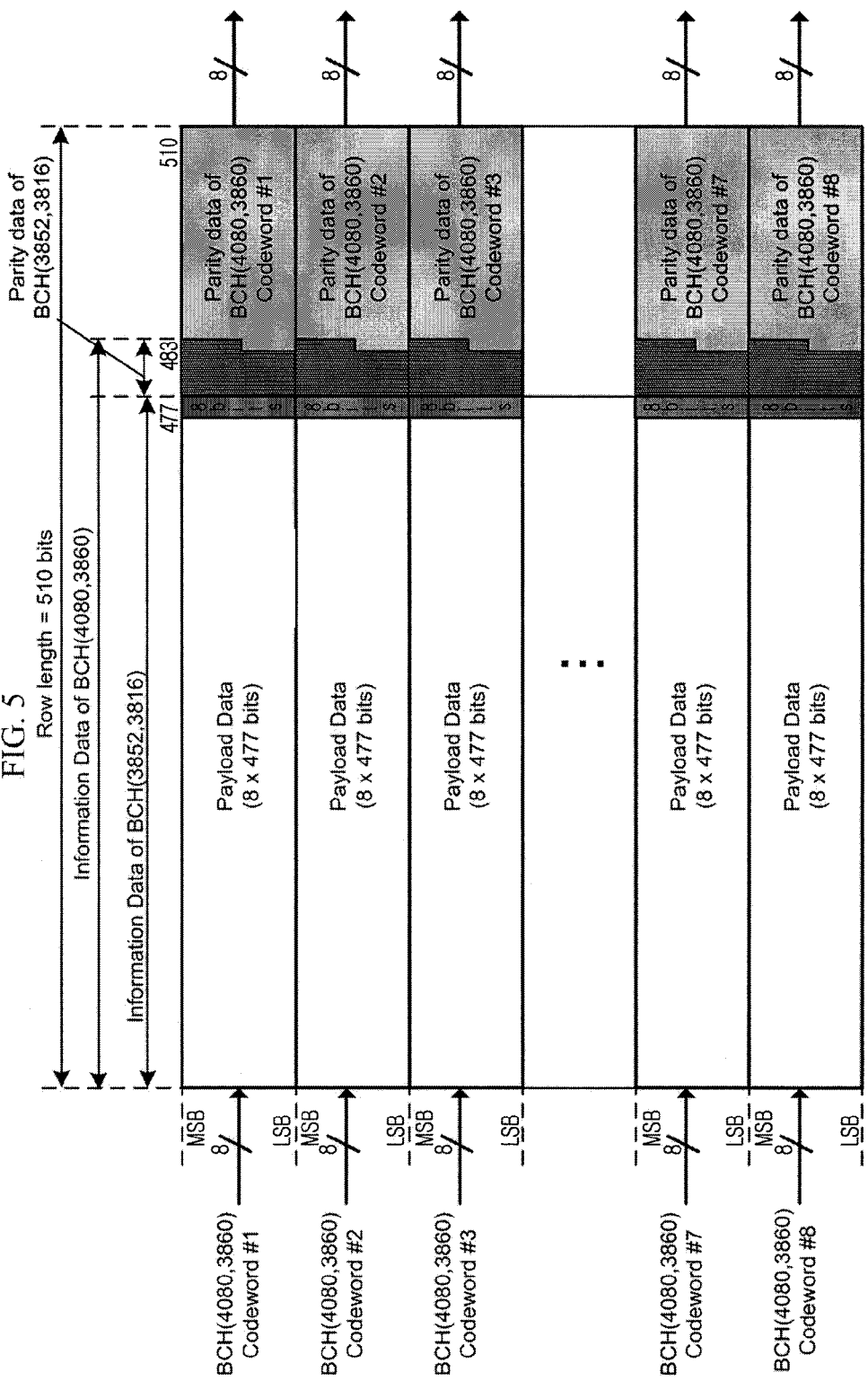

Referring to FIG. 5, eight 8-bits (total 8 bytes) displayed on a 478-byte column are the FS area shown in FIG. 3. First, when eight $BCH(3852,3816)_{byte}$ encoders are used with respect to information data of 3816(16×239-8) bytes, parity data of 8×36 bits may be generated. Next, 3860 bytes are generated by adding 8 bytes which are the FS area with respect to 3852 bytes outputted from the $BCH(3852,3816)_{byte}$ encoder. Next, when eight $BCH(4080,3860)_{bit}$ encoders are used with respect to 3860 bytes, parity data of 8×220 bits may be generated.

The $BCH(3852,3816)_{byte}$ encoder has the error correction performance higher than the $BCH(3860,3824)_{byte}$ encoder. As such, it is possible to improve the error correction performance by applying the $BCH(3852,3816)_{byte}$ encoder to the in-band area excluding the FS area.

Figure 6:
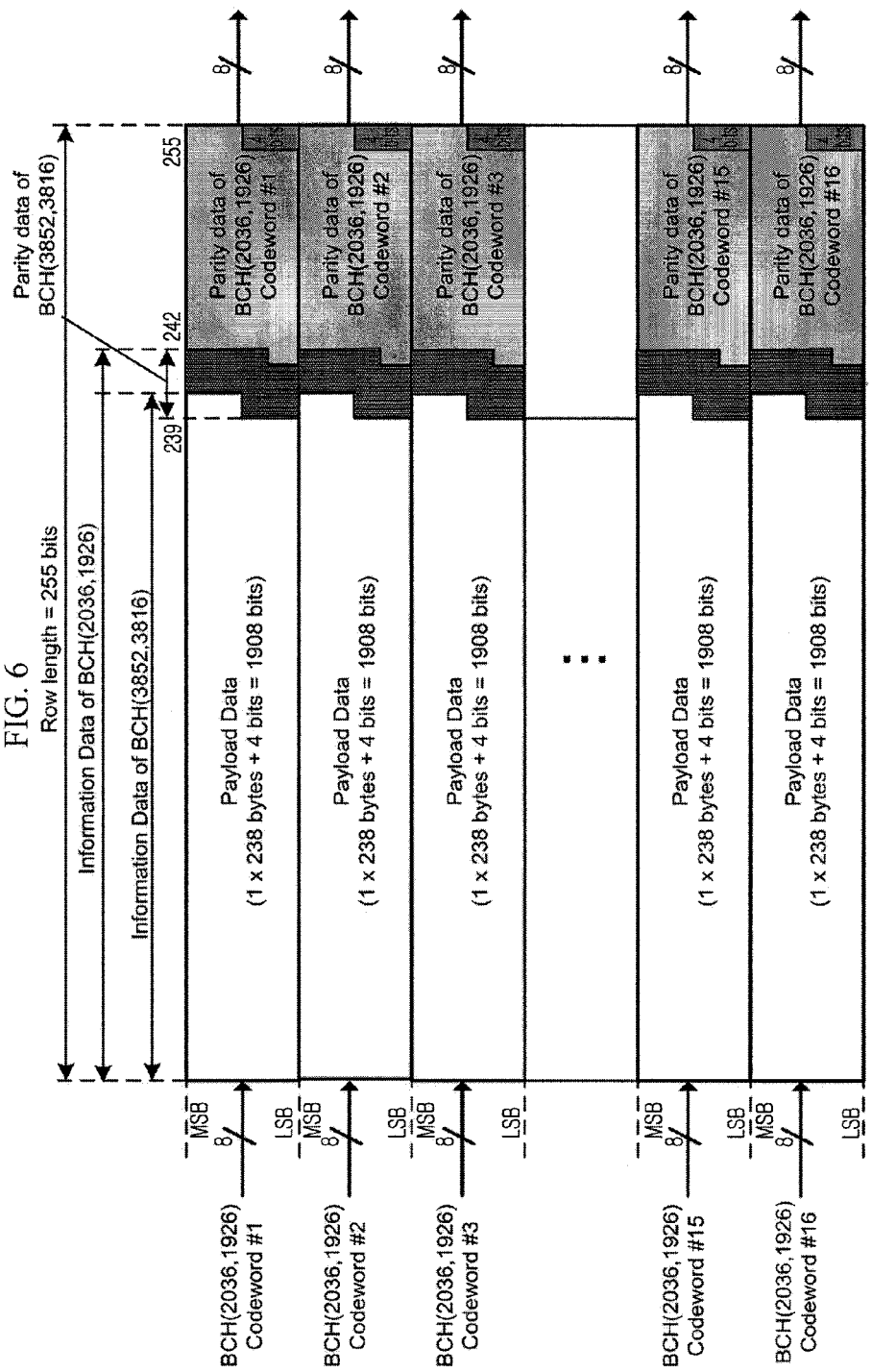

Referring to FIG. 6, sixteen 4-bits (total 8 bytes) displayed on a 255-byte column are the FS area shown in FIG. 3. First, when eight BCH(3852,3816)$_{byte}$ encoders are used with respect to information data of 3816(16×238+8) bytes, parity data of 8×36 bits may be generated. 3852 bytes outputted using the BCH(3852,3816)$_{byte}$ encoder are located up to a 241$^{st}$ column. Next, when sixteen BCH(2036,1926)$_{bit}$ encoders are used with respect to 3852 bytes outputted from the BCH(3852,3816)$_{byte}$ encoder, parity data of 16×110 bits may be generated. Next, 4080 bytes are generated by adding 8 bytes which are the FS area with respect to 4072 bytes outputted from the BCH(2036,1926)$_{byte}$ encoder.

The BCH(3852,3816)$_{byte}$ encoder has the error correction performance higher than the BCH(3860,3824)$_{byte}$ encoder. Meanwhile, in FIG. 6, the BCH(2036,1926)$_{bit}$ encoder is used instead of the BCH(2040,1930)$_{bit}$ encoder. The BCH(2040, 1930)$_{bit}$ encoder and the BCH(2036,1926)$_{bit}$ encoder are the same as each other in that both encoders correct an error of maximum 11 bits, but the BCH(2036,1926)$_{bit}$ encoder corrects the error of 11 bits among information data of 1926 bits to thereby have the error correction performance higher than the BCH(2040,1930)$_{bit}$ encoder. In particular, the FEC structure shown in FIG. 6 can acquire a higher performance by shortening the existing BCH encoder. Accordingly, the error correction performance can be improved without largely modifying the existing design.

Figure 7:
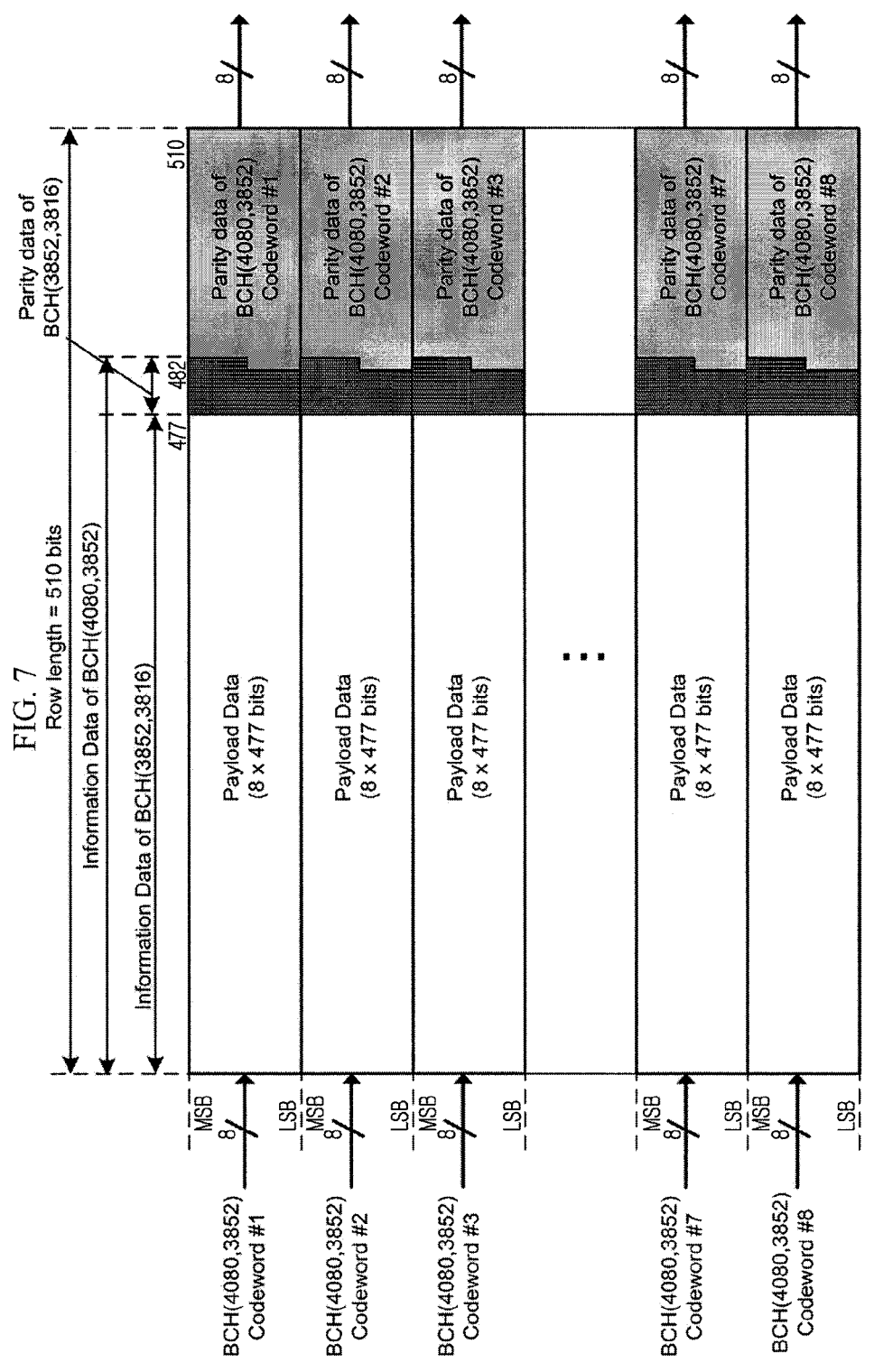

Referring to FIG. 7, a case in which an FS area is used as additional parity bytes for an FEC will be described. For example, 264 bytes acquired adding 8 bytes of an in-band area and 256 bytes of an out-band area to each other are used as the area for the FEC.

First, when eight BCH(3852,3816)$_{byte}$ encoders are used with respect to information data of 3816(16×238+8) bytes, parity data of 8×36 bits may be generated. 3852 bytes outputted using the BCH(3852,3816)$_{byte}$ encoder are located up to a 482 column. Next, when eight BCH(4080,3852)$_{bit}$ encoders are used with respect to 3852 bytes outputted from the BCH (3852,3816)$_{byte}$ encoder, parity data of 8×228 bits may be generated.

The BCH(3852,3816)$_{byte}$ encoder has the error correction performance higher than the BCH(3860,3824)$_{byte}$ encoder. In addition, the BCH(4080,3852)$_{bit}$ encoder has an error correction performance of maximum 19 bits. Accordingly, the FEC structure shown in FIG. 7 has the highest error correction performance.

As described above, the OTU4 frame structure shown in FIG. 3 can efficiently correct an error while transmitting a signal of approximately 100 Gbit/s. Hereinafter, a method of mapping a plurality of tributary signals of a total 100 Gbit/s capability or a signal of approximately 100 Gbit/s will be described through the OTU4 frame structure shown in FIG. 3. Hereinafter, as shown in FIG. 3, an overhead of the OTU4 frame is defined from a 1-byte column to a 16-byte column and OPU4 which is a payload is defined from a 17-byte column to a 3816-byte column (total 3800-byte columns). 3817-byte column to a 3824-byte column are defined as an FS area to be used as additional parity bytes for a fixed stuff or an FEC. The plurality of tributary signals or the 100 Gbit/s signal are mapped to OPU4 which is the payload.

Figure 8:
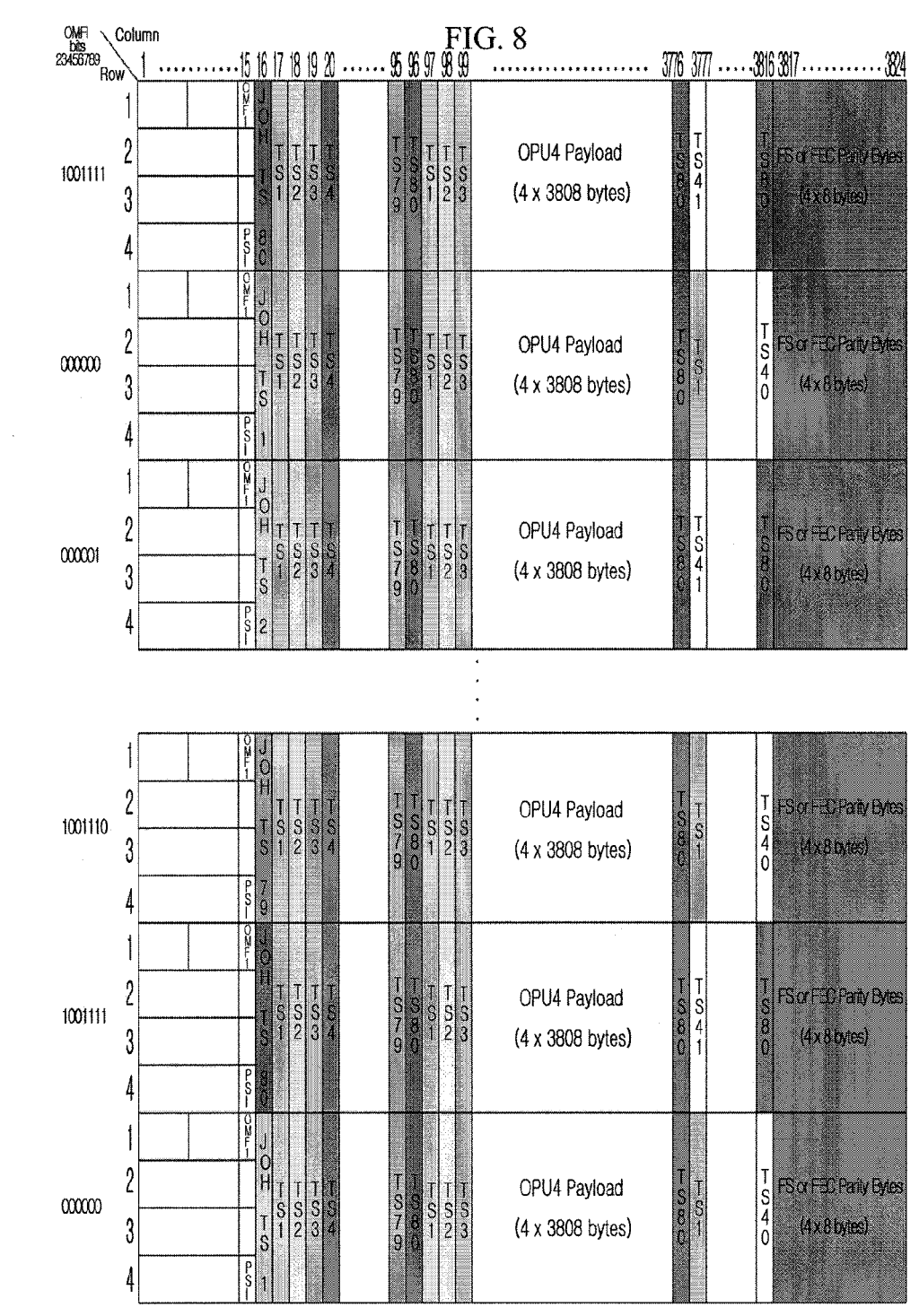

FIG. 8 is a diagram illustrating a method of mapping a tributary signal by using a frame structure shown in FIG. 3.

Referring to FIG. 8, as one example in which 3800-byte columns corresponding to OPU4 are allocated as tributary slots, 80 tributary slots are evenly allocated to the 17-byte column to the 3776-byte column and 40-byte columns of 3777 to 3816-byte columns may be further distributed for 80 tributary slots distributed to the 17 to 3776-byte columns. As such, OPU4 is divided into 80 1.25G tributary slots and a 1.25G signal may be transmitted through each tributary slot in a time division multiplexing (TDM) scheme.

Figure 9:
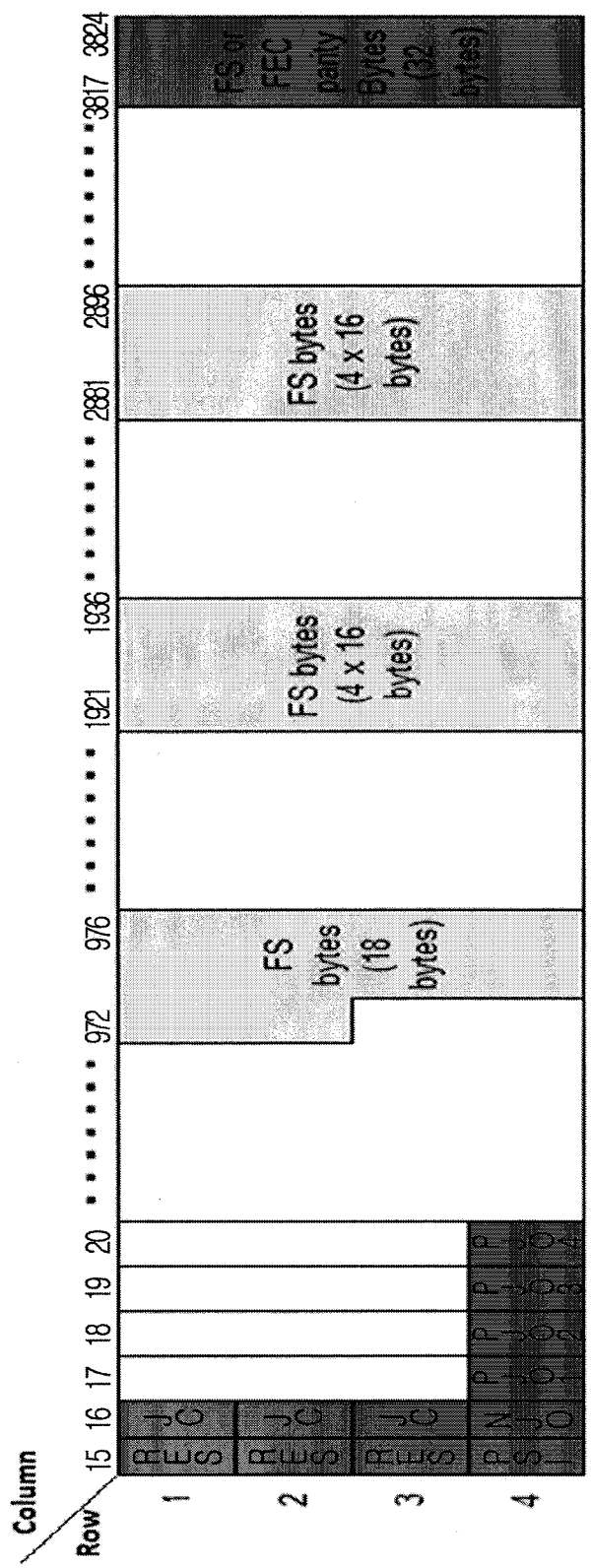
FIG. 9 illustrates a method of mapping a 100G Ethernet signal by using a frame structure shown in FIG. 3.

FIG. 9 illustrates a method of mapping a 1000 Ethernet signal by using a frame structure shown in FIG. 3.

Referring to FIG. 9, a 100G Ethernet signal is mapped to the 3800-byte columns which are OPU4. The capacity of OPU4 is approximately 104.136740088 Gbit/s (=4080/ 3800×OTU4 bit rate)±20 ppm and the bit rate of the 100G Ethernet signal is 103.125 Gb/s±100 ppm. Therefore, OPU4 can bit-transparently receive the 100G Ethernet signal. At this time, a difference between the capacity of OPU4 and the bit rate of the 100G Ethernet signal is approximately 1.011740088 Gb/s and difference sections can be filled by mapping additional fixed stuffs. For example, 18-byte columns of 972 to 976-byte columns, 16-byte columns of 1921 to 1936-byte columns, and 16-byte columns of 2881 to 2896-byte columns can be mapped with the additional fixed stuffs. Herein, a negative justification opportunity (NJO) defined in a 16-th column and positive justification opportunities (PJO) defined in 17 to 20-th columns are bytes for justification of the clock speed of OPU4 and the clock speed of the 100G Ethernet signal.

FIG. 10 illustrates another method of mapping a 100G Ethernet signal by using a frame structure shown in FIG. 3.

Referring to FIG. 10, a serial number is allocated to each byte in order to map the 100G Ethernet signal to 3800-byte columns which are OPU4. OPU4 can be allocated to #1 to #15200(4*3800).

Meanwhile, due to the difference between the capacity of OPU4 and the bit rate of the 100G Ethernet signal, only 15018 to 15023 bytes among 15200 bytes of OPU4 may be mapped for the 100G Ethernet signal and the rest 177 to 182 bytes may be mapped with additional fixed stuffs. For example, the additional fixed stuffs may be mapped in accordance with a signal-delta scheme. Assuming that the serial number allocated to each byte of OPU4 is n, when n satisfies (n×m) mod 15200<m, the 100G Ethernet signal is mapped to an n-th byte and when n satisfies (n×m) mod 15200≧m, an additional fixed stuff may be mapped to the n-th byte.

Figure 11:
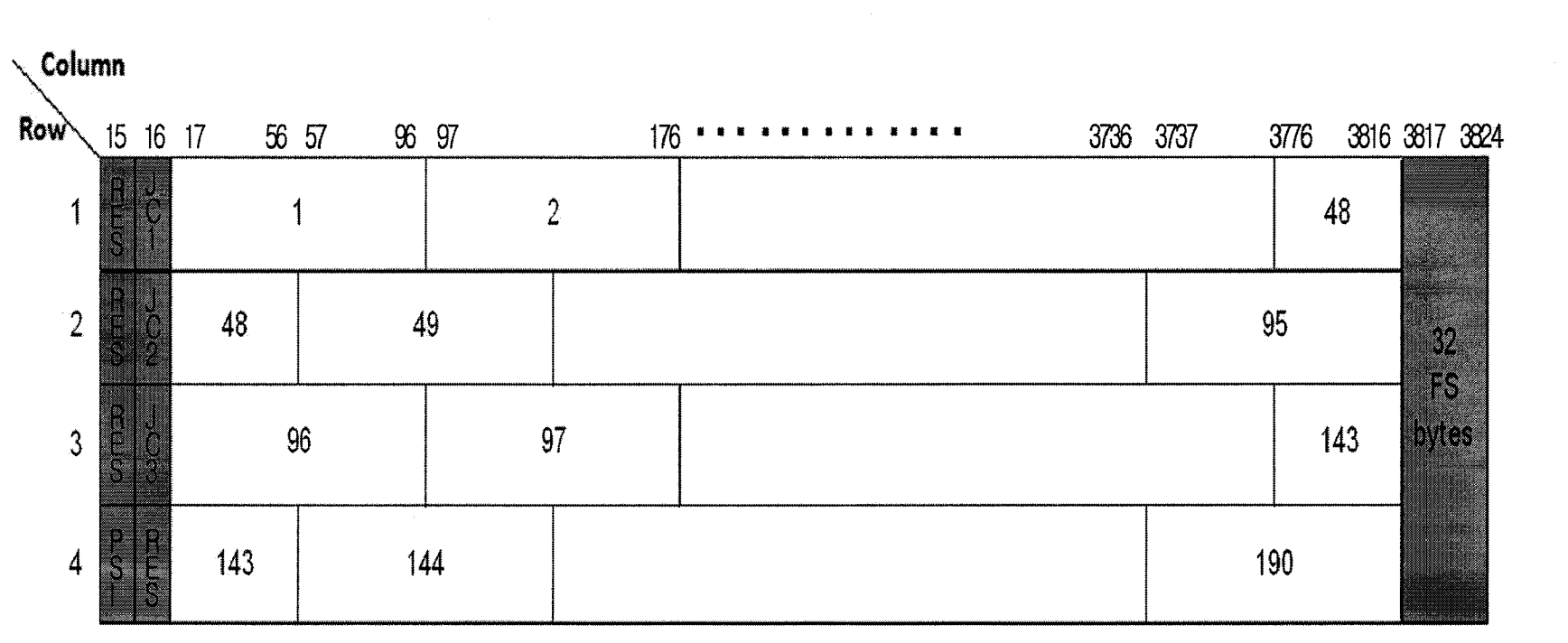

FIG. 11 illustrates yet another method of mapping a 100G Ethernet signal by using a frame structure shown in FIG. 3.

Figure 12:
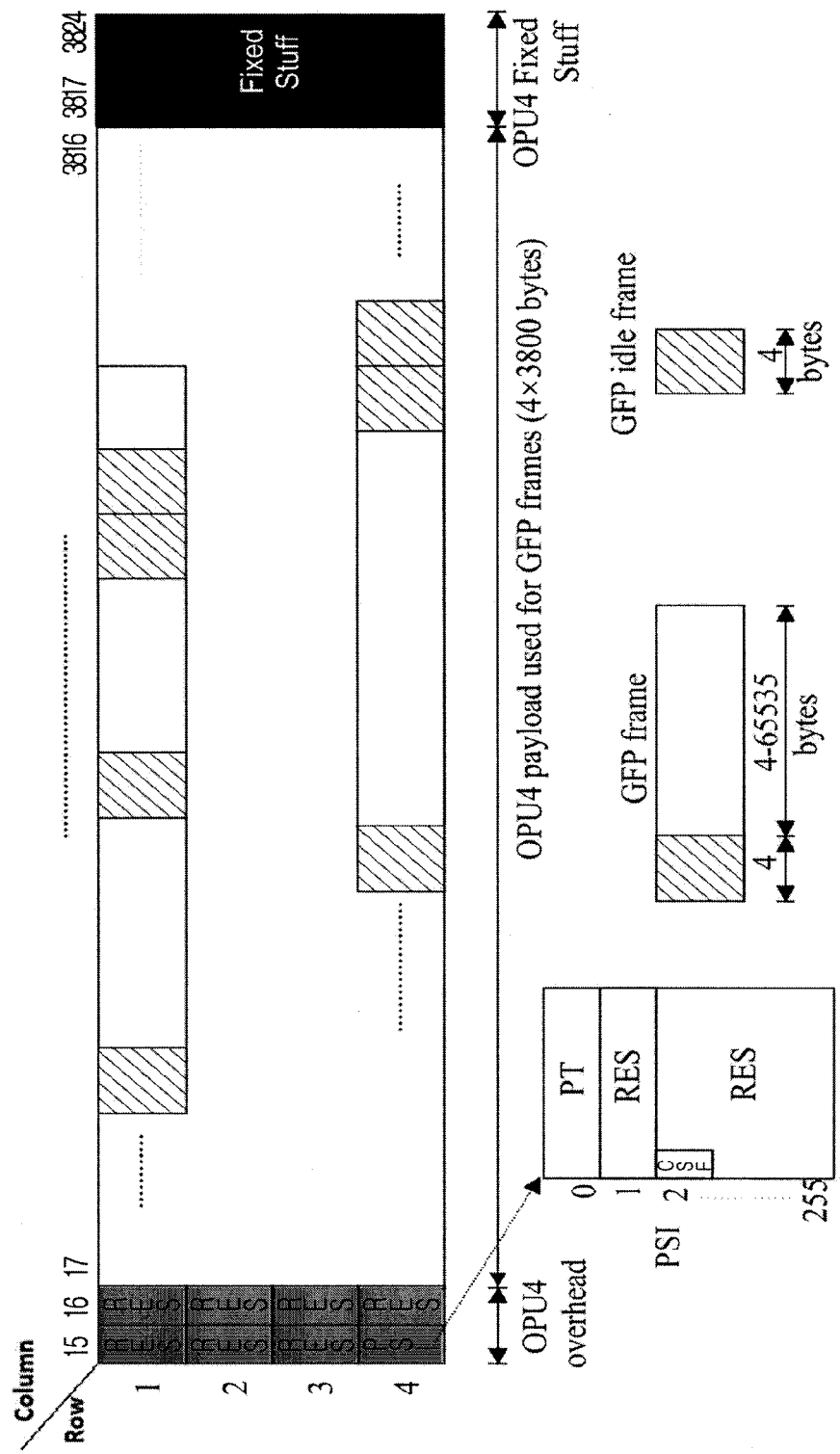
FIG. 12 illustrates a method of mapping a 100G generic framing procedure (GFP) signal by using a frame structure shown in FIG. 3.

Referring to FIG. 11, 80 bytes of OPU4 may be grouped as one group in order to map the 100G Ethernet signal to the 3800-byte columns which are OPU4. OPU4 is constituted by total 15200 bytes to be thus divided into total 190 groups. The number of each group may be allocated as shown in FIG. 12. For example, in one row of OPU4, first 80 bytes may be allocated to a first group and subsequent 80 bytes may be allocated to a second group. Accordingly, the 100G Ethernet signal may be mapped by the unit of consecutive 80 bytes or the additional fixed stuff may be mapped.

FIG. 12 illustrates a method of mapping a 100G generic framing procedure (GFP) by using a frame structure shown in FIG. 3.

Referring to FIG. 12, as one example in which the 100G GFP frame is mapped to OPU4, the GFP frame is mapped to an OPU4 area excluding the FS area. At this time, the GFP frame has a variable length. In FIG. 12, the GFP frame has a length of 4 bytes to 65535 bytes, but the length of the GFP frame is not limited. Accordingly, the GFP frame may intersect a boundary of OPU4.

Meanwhile, for encapsulation of the GFP frame, an idle frame may be inserted into the first part or the last part of the GFP frame. As a result, the GFP frame may be mapped with consecutive bit streams having a capacity equal to the capacity of the OPU4 area. The GFP frame is scrambled during encapsulation. At the step where the GFP frame is mapped to OPU4, bit rate adaptation or scrambling is not required. Herein, overheads of 15 and 16-th columns include a 1-byte payload structure identifier PSI and a 7-byte reserved area RES. The PSI includes a payload type PT, a client signal failure CSF, and a reserved area of 254 bytes.

Figure 13:
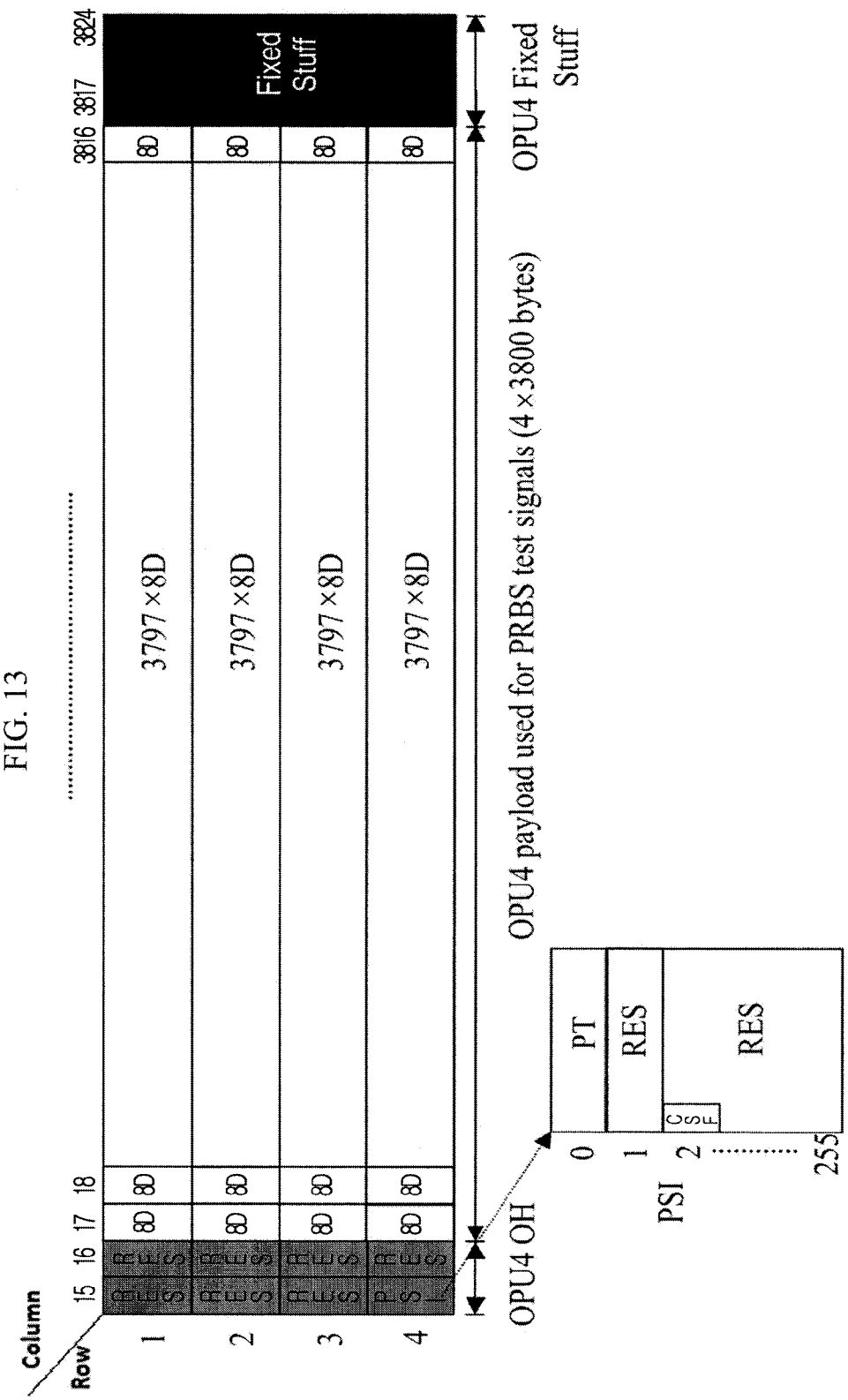
FIG. 13 is a structure diagram receiving a 100G pseudo random bit sequence (PRBS) test signal by using a frame structure shown in FIG. 3.

FIG. 13 is a structure diagram receiving a 100G pseudo random bit sequence (PRBS) test signal by using a frame structure shown in FIG. 3.

Referring to FIG. 13, the PRBS test signal may be mapped to the OPU4 area of 4×3800 bytes. PRBS ($2^{31}$−1) of 2,147,483,647 bits for a test may be mapped to the OPU4 area. At this time, the PRBS signal of 2,147,483,647 bits may be mapped by the unit of consecutive 8 bits (8D), that is, by the unit of one byte. Meanwhile, the OPU4 overhead for mapping the PRBS is constituted by the payload type PT, the client signal failure CSF, and a payload structure identifier PSI constituted by 254 reserved bytes and 7 reserved bytes.

Figure 14:
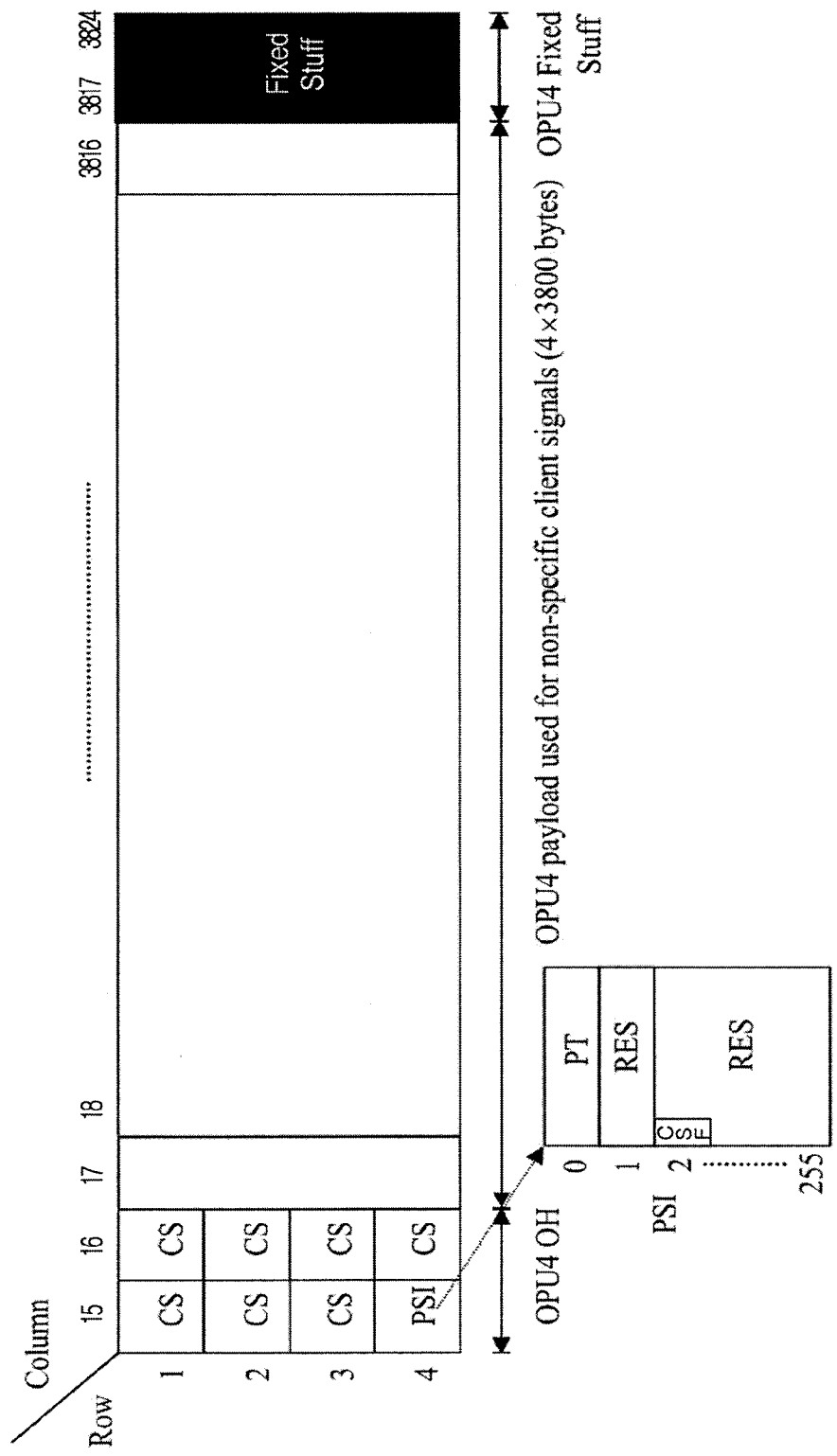
FIG. 14 illustrates a method of mapping a 100G client signal by using a frame structure shown in FIG. 3.

FIG. 14 illustrates a method of mapping a 100G client signal by using a frame structure shown in FIG. 3. The 100G client signal represents a predetermined client signal having a capacity of 100G in addition to the GFP frame and the PRBS test signal shown in FIGS. 12 and 13.

Referring to FIG. 14, the 100G client signal is encapsulated with consecutive bit streams having a bit rate of OPU4 and may be then mapped to the OPU4 area. Herein, the case of the bit stream may include predetermined justification while the consecutive bit streams are generated to be synchronized with OPU4. The consecutive bit streams may be scrambled before being mapped to the OPU payload. The OPU4 overhead for mapping is constituted by the payload type PT, the client signal failure CSF, and the payload structure identifier PSI constituted by 254 reserved bytes and 7 bytes for a client specification (CS).

As such, a predetermined client signal may be mapped to a part (i.e., 3800-byte columns) of the in-band area and the rest part (i.e., 8-byte columns) may be set as the FS area. The FS area may be used as the fixed stuff or the additional parity byte for the FEC. Herein, the FS area includes the 8-byte columns, but is not limited thereto. The FS area may be set to a predetermined range among 1 to 3807-byte columns.

Figure 15:
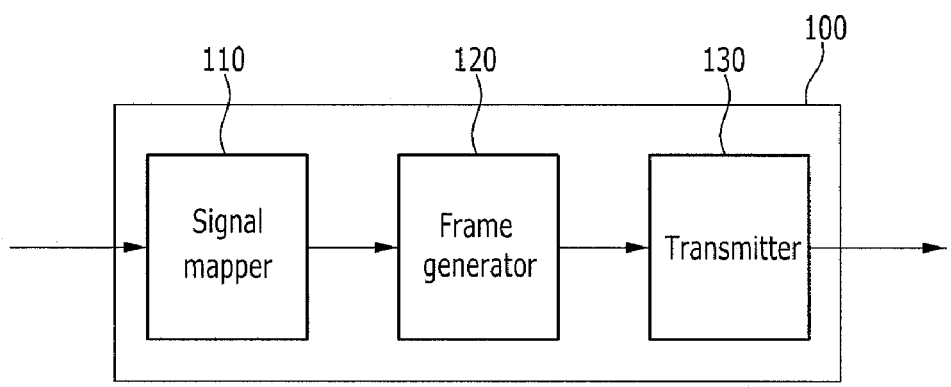
FIG. 15 is a block diagram of a transmitting apparatus in an optical transport network according to an exemplary embodiment of the present invention.

FIG. 15 is a block diagram of a transmitting apparatus in an optical transport network according to an exemplary embodiment of the present invention.

Referring to FIG. 15, a transmitting device 100 includes a signal mapper 110, a frame generator 120, and a transmitter 130. The signal mapper 110 maps a signal, that is, information data to a frame. The signal mapper 110 may map a plurality of tributary signals, an Ethernet signal, a generic framing procedure (GFP) signal, a pseudo random bit sequence (PRBS) test signal, and a predetermined client signal. The signals mapped by the signal mapper 110 may have a bit rate of, for example, 100 Gbit/s. Specifically, the signal mapper 110 may map a 100G signal to an OTU4 frame by methods shown in FIGS. 8 to 14. The frame generator 120 generates a frame to include an in-band area including an area allocated for information data and an area allocated for a fixed stuff or additional parity information for FEC and an out-band area including parity information for the FEC. For example, the frame generator 120 may perform FEC encoding by methods shown in FIGS. 4 to 7. The transmitter 130 transmits the signals mapped to the frame to a receiving device.

Figure 16:
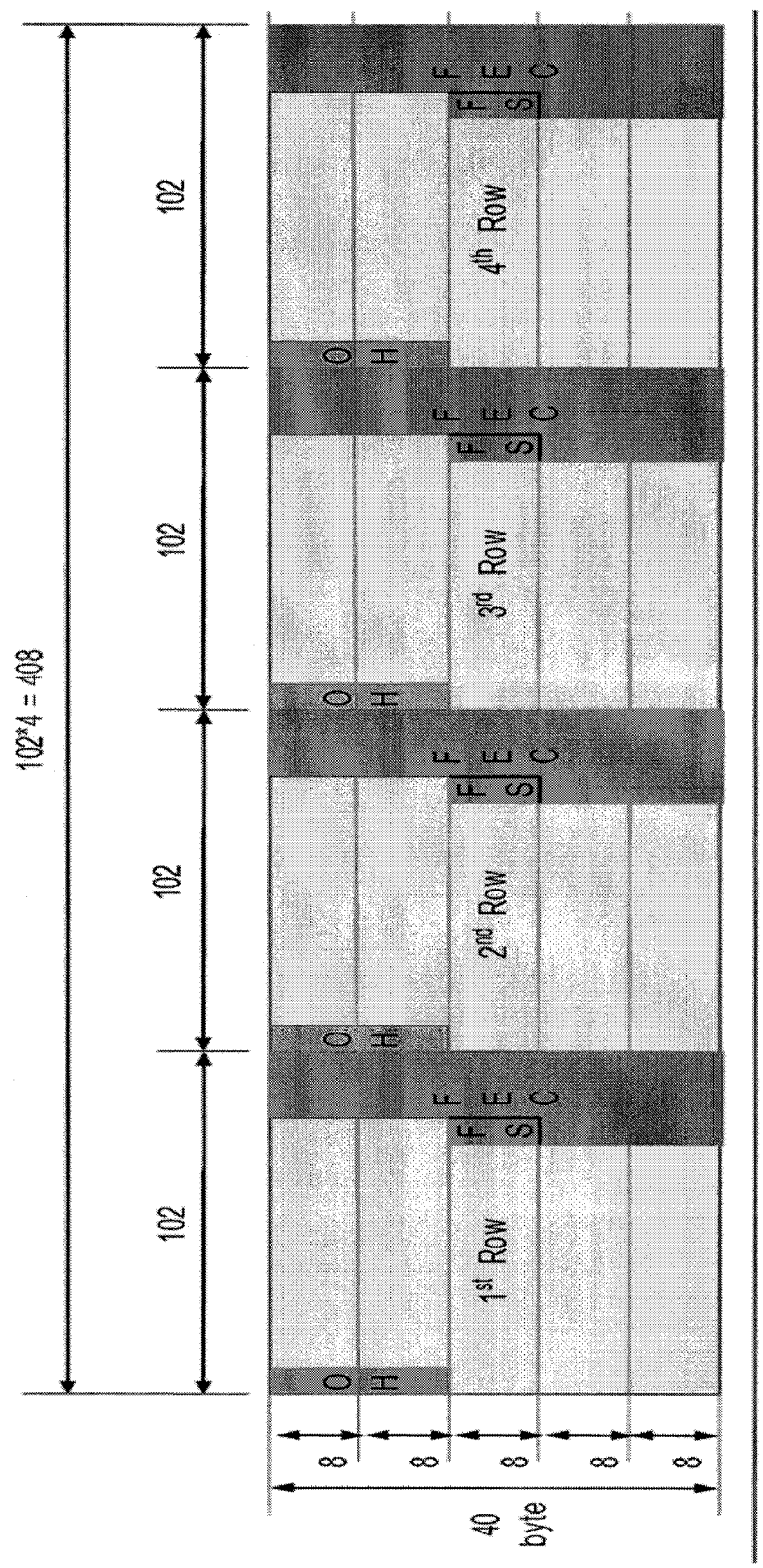
FIG. 16 is a diagram illustrating a frame structure shown in FIG. 3 in a 40-byte (320-bit) parallel type.

FIG. 16 is a diagram illustrating a frame structure shown in FIG. 3 in a 40-byte (320-bit) parallel type.

Referring to FIG. 16, in the case in which one row of the frame includes the fixed stuff FS of 8 bytes, 3800 bytes other than the fixed stuff of 8 bytes as shown in FIG. 3, an overhead OH of 16 bytes, and FEC of 256 bytes are allocated to the information data. 3800 are the multiple of 40. Therefore, when 3800 are parallel-processed with 40 bytes, the information data of 3800 bytes is mapped every 95 clocks. That is, in the case in which one frame constituted by 4 rows includes a fixed stuff FS of 4×8 bytes and is parallel-processed with 40 bytes, information data of 15200(4×3800) bytes may be mapped with the maximum 380(95×4) clocks.

Figure 17:
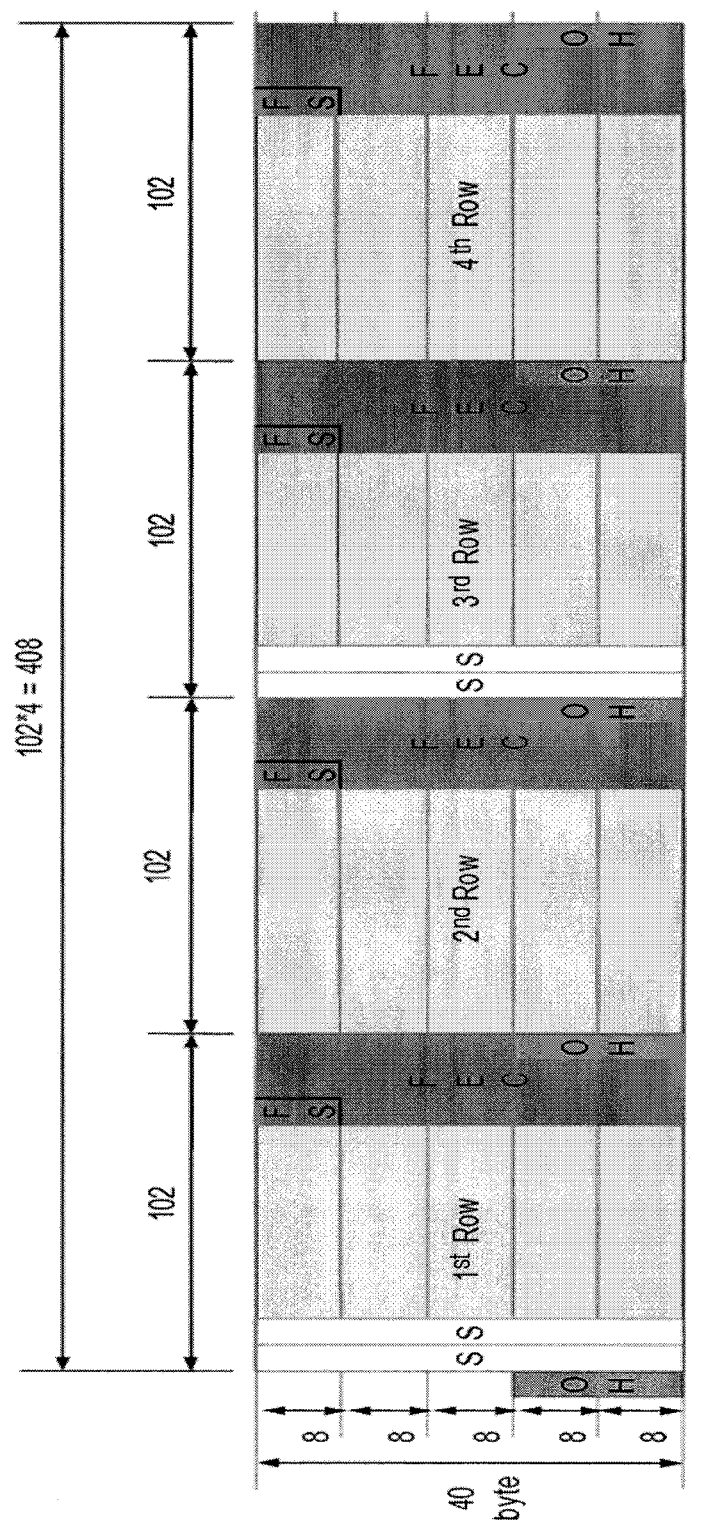
FIGS. 17 and 18 are diagrams further including a flexible stuff S in a 40-byte (320-bit) parallel-type frame structure.
Figure 18:
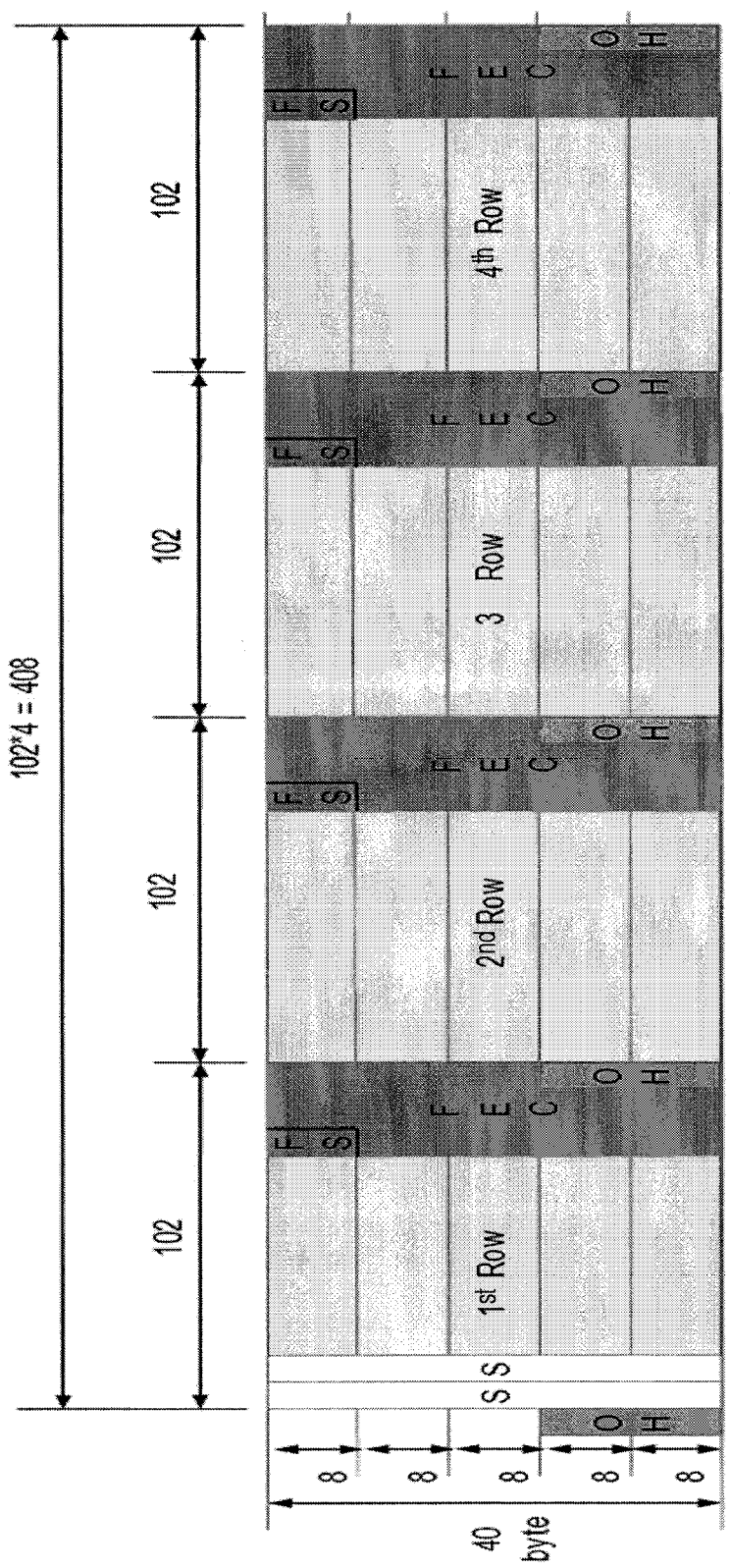

FIGS. 17 and 18 are diagrams further including a flexible stuff S in a 40-byte (320-bit) parallel-type frame structure.

Referring to FIG. 17, the frame further includes a flexible stuff S of 160(2×80) bytes. Accordingly, information data of 15040 bytes (15200 bytes--160 bytes) may be mapped to the frame shown in FIG. 17.

Referring to FIG. 18, the frame further includes a flexible stuff S of 80 bytes. Accordingly, information data of 15120 bytes (15200 bytes–80 bytes) may be mapped to the frame shown in FIG. 18.

In the case in which the payload transmission speed of the frame is different from the transmission speed of the mapped information data, that is, in the case of asynchronous mapping, the flexible stuff may be used in order to compensate the difference in the transmission rate. For example, in the case in which the flexible stuff of 160(2×80) bytes is included in the frame, when the speed of the signal of the information data is higher than the speed of a payload output signal of the frame (that is, when the number of signals to be transmitted increases), a flexible stuff of 80 bytes among the flexible stuff of 160 bytes may be decreased and additional information data of 80 bytes may be loaded and transmitted. In contrast, in the case in which the flexible stuff of 80 bytes is included in the frame, when the speed of the signal of the inputted information data is lower than the speed of the payload output signal of the frame, the flexible stuff of 80 bytes is further included to averagely make the speed of the inputted information data and the speed of the outputted frame payload signal be equal to each other.

Figure 19:
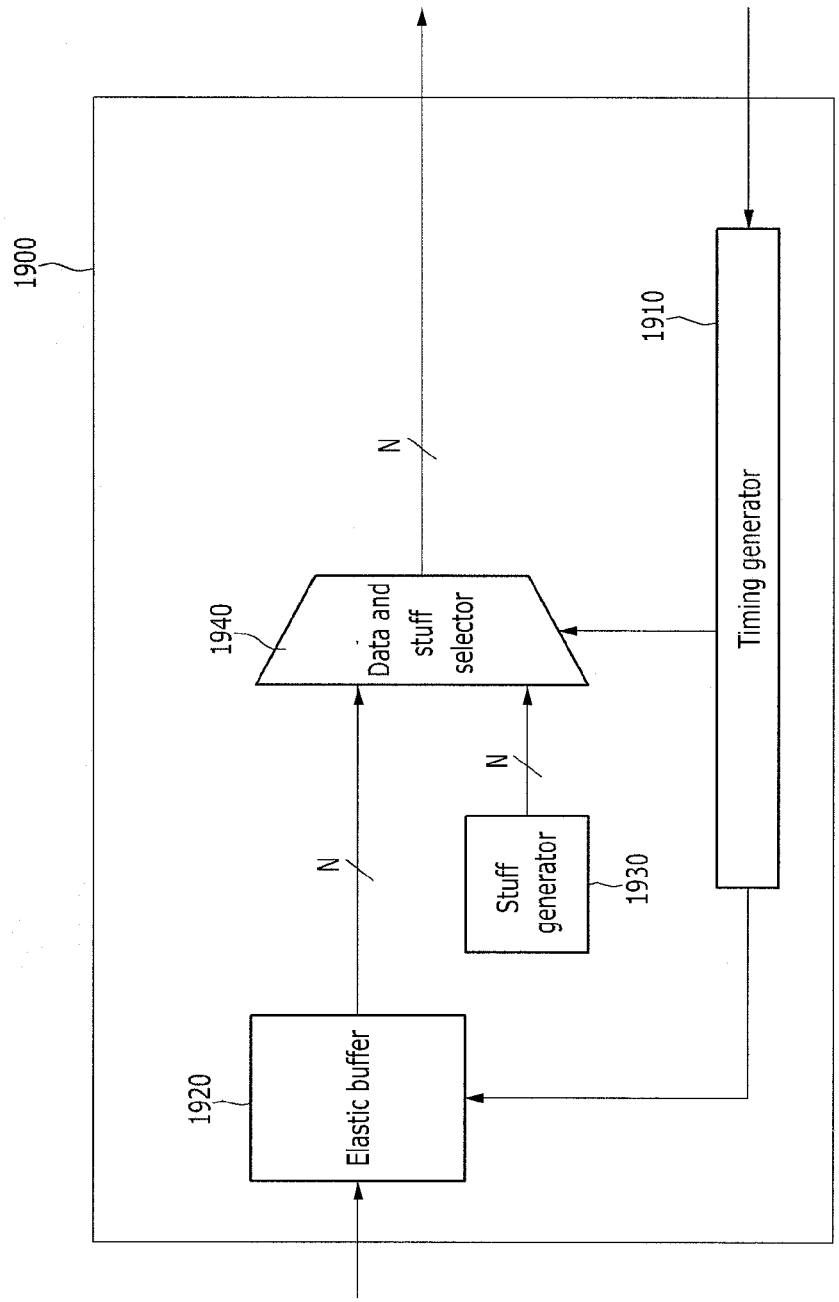
FIG. 19 is a block diagram of a signal mapping device 1900 according to an exemplary embodiment of the present invention.

FIG. 19 is a block diagram of a signal mapping device 1900 according to an exemplary embodiment of the present invention.

Referring to FIG. 19, the signal mapping device 1900 includes a timing generator 1910, an elastic buffer 1920, a stuff generator 1930, and a data and stuff selector 1940.

The elastic buffer 1920 stores information data and outputs the information data in accordance with an output timing of information data received from the timing generator 1910. The timing generator 1910 receives a frame start signal FSS and then provides the output timing of the information data. When the frame is parallel-processed with 40 bytes, as shown in FIGS. 17 and 18, the stuff generator 1930 generates a stuff of 40 bytes (that is, a value of 0) and transfers the stuff to the data and stuff selector 1940. The data and stuff selector 1940 selects any one of the information data outputted from the elastic buffer 1920 and the stuff outputted from the stuff generator 1930 to time-multiplex the stuff and the information data. The data and stuff selector 1940 may select the information data or the stuff on the basis of a selection timing signal received from the timing generator 1910. At this time, in the case in which a fixed stuff of 8 bytes is used in FIGS. 17 and 18, when the value of 0 is inserted into total 40 bytes together with 32 bytes of an FEC parity area, the value of 0 of 40 bytes generated by the stuff generator 1930 is used. Likewise, the value of 0 of 40 bytes is used and inserted into all locations of 220 bytes of the FEC parity area other than 36 bytes. That is, the value of 0 may be inserted into all locations of FS 8 bytes and FEC parity 256 bytes in addition to the stuff of 40 bytes in FIGS. 17 and 18 by using only the stuff generator 1930.

Figure 20:
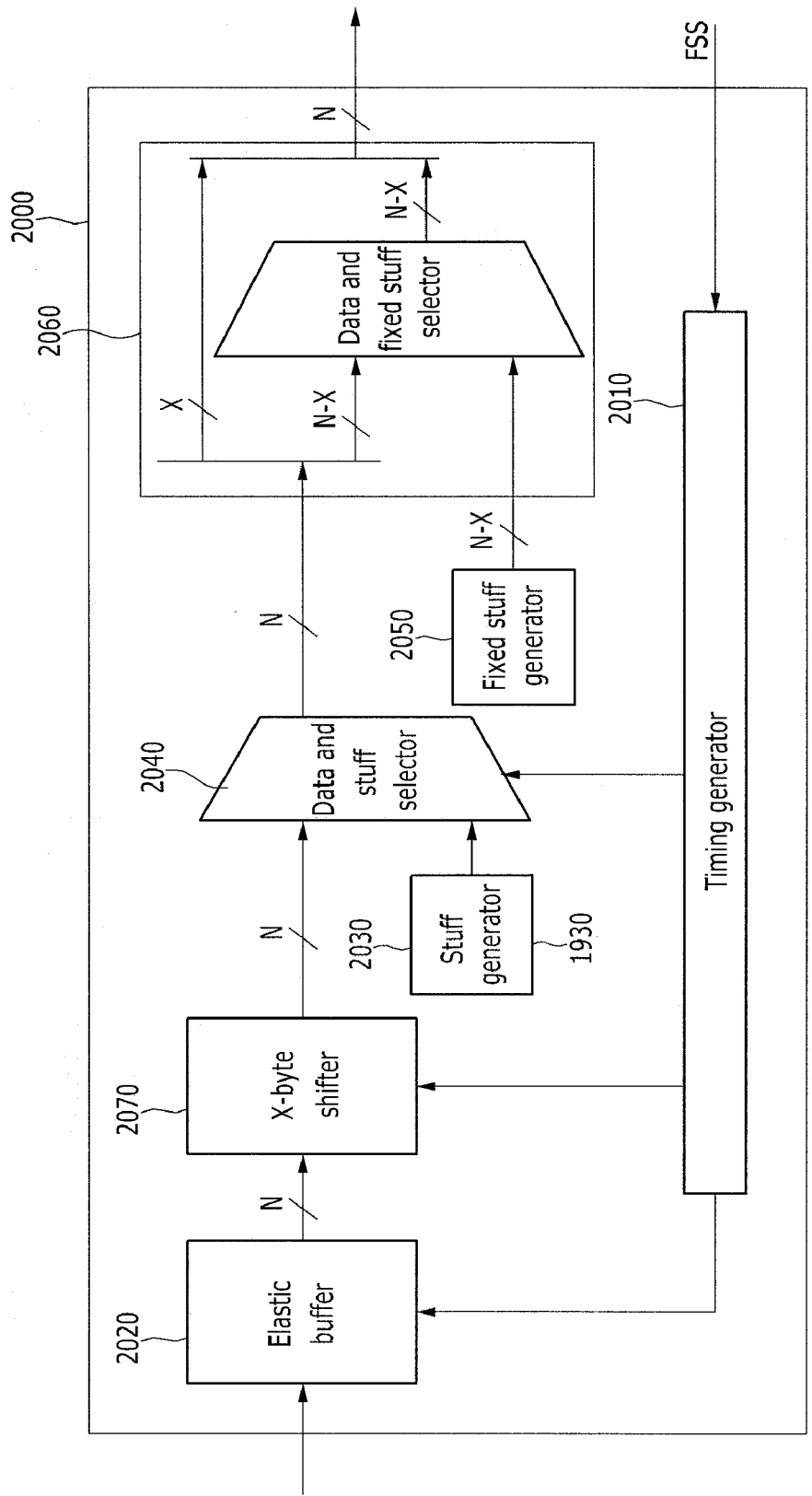
FIG. 20 is a block diagram of a signal mapping device 2000 according to another embodiment of the present invention.

FIG. 20 is a block diagram of a signal mapping device 2000 according to another embodiment of the present invention.

Referring to FIG. 20, the signal mapping device 2000 includes a timing generator 2010, an elastic buffer 2020, a stuff generator 2030, a data and stuff selector 2040, a fixed stuff generator 2050, a data and fixed stuff selector 2060, and an X-byte shifter 2070.

The elastic buffer 2020 stores information data and outputs the information data in accordance with an output timing of information data received from the timing generator 2010.

The X-byte shifter 2070 shifts the information data outputted from the elastic buffer 2020 by X bytes in accordance with a control signal from the timing generator 2010. In the case in which, a fixed stuff of m bytes is inserted, a value of X is (8−m) mod 40. When (8−m) mod N has a negative value, a multiple of 40 is added to X to have a positive value. For example, in the case in which the 40-byte parallel processing (N=40) is performed as shown in FIGS. 17 and 18 and the fixed stuff of 8 bytes (m=8) is inserted, the value of X is 0 and the X-byte shifter 2070 does not shift the information data by any value. If 40-byte parallel processing (N=40) is performed and a fixed stuff of 0 byte (m=0) is inserted, the value of X is 8 bytes and the X-byte shifter 2070 shifts the information data by 8 bytes. Likewise, if the 40-byte parallel processing (N=40) is performed and a fixed stuff of 16 byte (m=16) is inserted, the value of X is 32 bytes acquired by converting −8 bytes to a positive value and the X-byte shifter 2070 shifts the information data by 32 bytes.

When N-byte parallel processing is performed as shown in FIGS. 17 and 18, the stuff generator 2030 generates a stuff of N bytes (that is, a value of 0) and transfers the stuff to the data and stuff selector 2040.

The data and stuff selector 2040 selects any one of the information data outputted from the X-byte shifter 2070 and the stuff outputted from the stuff generator 230 to time-multiplex the stuff and the information data as shown in FIGS. 17 and 18. The data and stuff selector 2040 may select the information data or the stuff on the basis of a selection timing signal received from the timing generator 2010.

The fixed stuff generator 2050 generates a stuff of N-X bytes (that is, a value of 0) and transfers the stuff to the data and fixed stuff selector 2060. In the case of using the fixed stuff of m bytes in the frame, the value of X can be acquired in accordance with the value of N of the parallel processing byte and the fixed stuff generator 2050 thus generates the value of 0 of the N-X bytes.

The data and fixed stuff selector 2060 transfers N bytes outputted from the data and stuff selector 2040 to the frame generator at a data transmission timing, but transfers X bytes among N bytes outputted from the data and stuff selector 240 at a timing to add the fixed stuff to the frame generator as it is and transfers the rest N-X bytes to the frame generator by selecting N-X bytes generated by the fixed stuff generator 2050. The timing generator 2010 provides information on the data transmission timing or the timing to add the fixed stuff to the data and fixed stuff selector 2060.

For example, when the 100G GFP signal is transferred while being mapped to the OPU4 signal as shown in FIG. 12, the signal mapping device of FIG. 20 may be used in the case of support 0 byte or 8 bytes for the fixed stuff. In the case in which 8 bytes are used for the fixed stuff, that is, in the case in which m=8 and N=40, the value of X is 0. Therefore, the X-byte shifter 2070 does not shift any byte. Further, the fixed stuff generator 2050 also generates a value of 0 of 40 bytes because X=0. The data and fixed stuff selector 2060 selects and transmits the fixed stuff of 40 bytes and the stuff to the frame generator instead of the information data at the timing to insert the fixed stuff, that is, 96, 198, 300, and 402 clock timings when 408 clocks are one frame cycle as shown in FIG. 17.

In the case in which 0 byte are used for the fixed stuff, that is, in the case in which m=0 and N=40, the value of X is 8. Therefore, the X-byte shifter 2070 shifts 8 byte every row 2, 3, and 4 of the frame. Further, the fixed stuff generator 2050 generates a value of 0 of 32 bytes. The data and fixed stuff selector 2060 selects upper 8 bytes as data and transfers it to the frame generator and selects the rest 32 bytes as the fixed stuff and transfers it to the frame generator at the timing to insert the fixed stuff, that is, at 96, 198, 300, and 402 clock timings when 408 clocks are is one frame cycle. As such, it is possible to map the signal while changing the value of the fixed stuff to be used.

Figure 21:
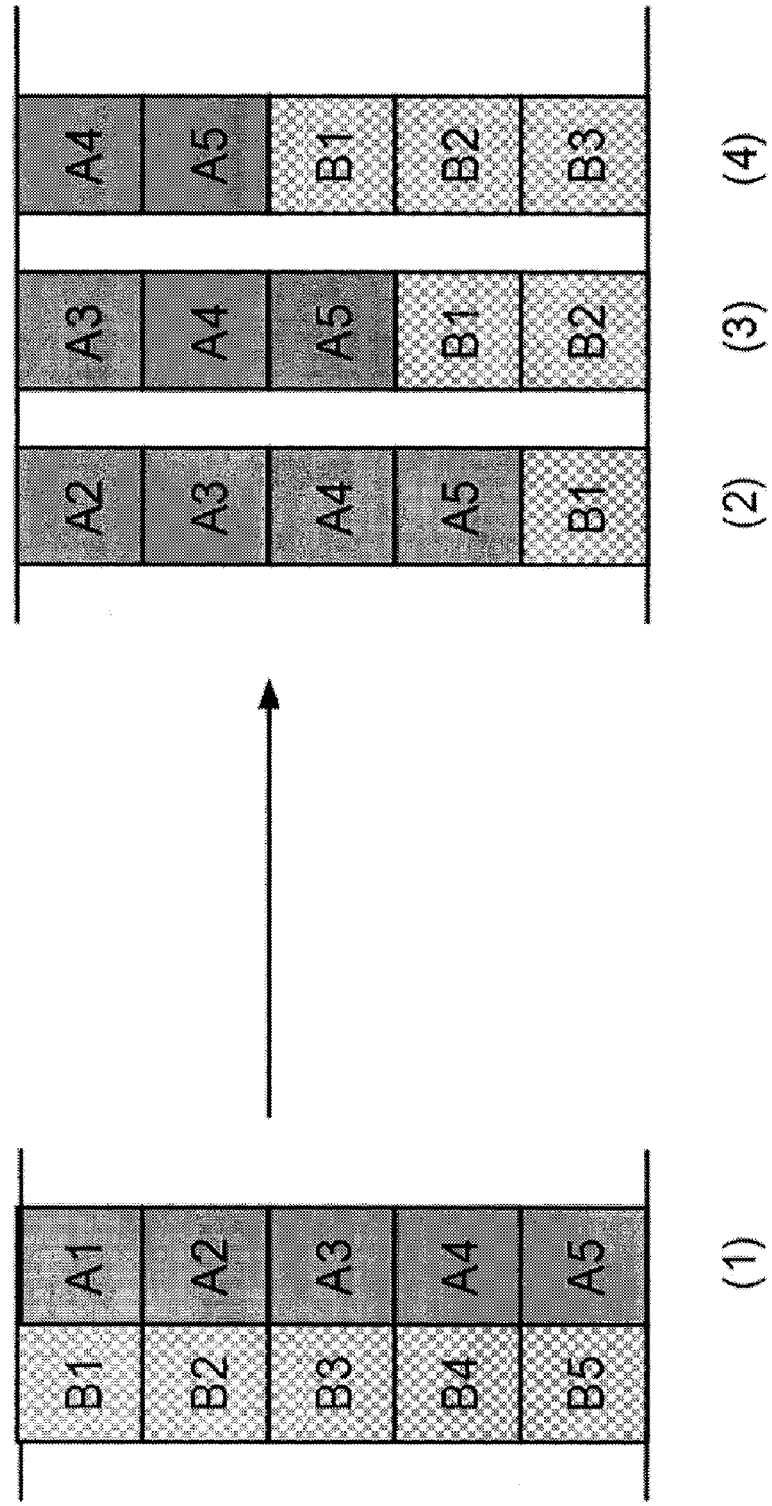
FIG. 21 is an illustration diagram for describing an operation of an X-byte shifter 2070.
Figure 22:
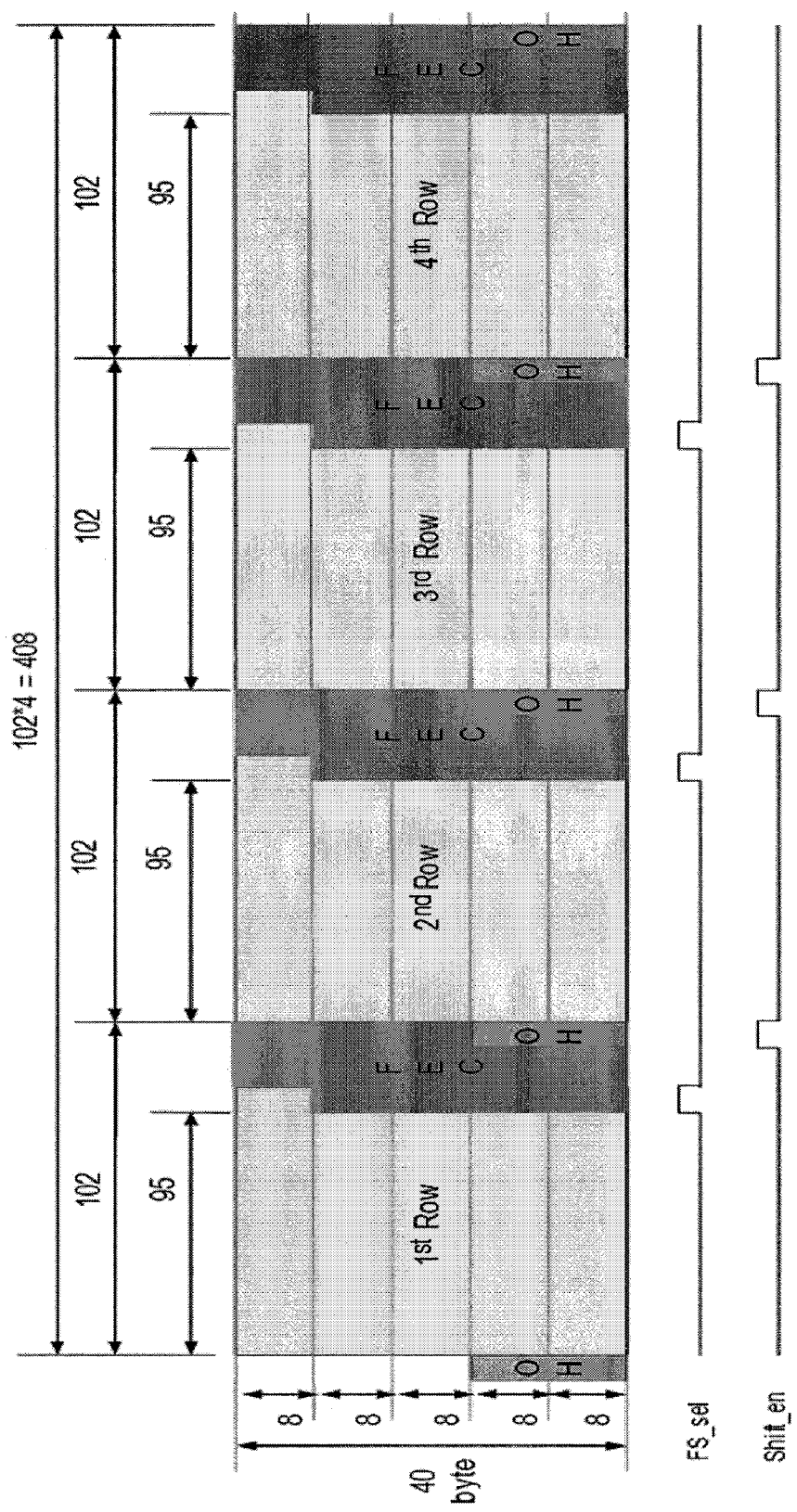
FIG. 22 is a timing diagram of a signal for a timing generator 2010 to control an X-byte shifter 2070 and a data and fixed stuff selector 2060.

FIG. 21 is an illustration diagram for describing an operation of an X-byte shifter 2070 and FIG. 22 is a timing diagram of a signal for a timing generator 2010 to control an X-byte shifter 2070 and a data and fixed stuff selector 2060.

Referring to FIG. 22, the data and fixed stuff selector 2060 inserts the fixed stuff in accordance with a fixed stuff selection (FS_Sel) signal. Therefore, in order to transfer the information data outputted from the elastic buffer 2020 in full, a shift enable signal Shift_en is high so that the information data is shifted by X bytes in the X-byte shifter 2070.

Referring to FIG. 21, when the 40-byte parallel processing is performed, a name is given in the order of 1, 2, 3, 4, and 5 every 8 bytes and the signal of the timing outputted from each elastic buffer 2020 is called A, B. Signal (1) is a signal when the data outputted from the elastic buffer 2020 is outputted without byte shifting. In the case in which the fixed stuff is 8 bytes, that is, in the case in which m=8 and N=40, the value of X is 0. Therefore, the X-byte shifter 2070 needs not to shift any byte. The signal (1) is outputted in the X-byte shifter 2070 as it is.

However, in the case in which 0 byte is used for the fixed stuff (that is, the value of X is 8 in the case in which m=0 and N=40), as shown in FIG. 22, only data of 8 bytes among the information data of 40 bytes outputted from the elastic buffer 2020 is transferred to the frame generator and the rest 32 bytes are inserted into the value of 0 at a timing when a 96-th fixed stuff of each row every frame is inserted, that is a timing when the fixed stuff selection signal FS_Sel generated by the timing generator 2010 is high. Therefore, in order to transfer the rest 32 bytes at a subsequent row of the frame which is a subsequent data insertion timing, the X-byte shifter 2070 shifts 8 bytes while the shift enable signal(Shift_en) is high.

As such, in the case in which 0 byte is used for the fixed stuff, the X-byte shifter 2070 shifts the information data by 8 bytes and outputs it every column 2, 3, and 4 of the frame, that is, whenever the shift enable signal Shift_en is high. That is, the X-byte shifter 2070 outputs signal (2) acquired by shifting the signal (1) by 8 bytes from a $103^{rd}$ timing when a second row of the frame is started. That is, the X-byte shifter 2070 outputs signal (3) acquired by shifting the signal (2) by 8 bytes from a $205^{th}$ timing when a third row of the frame is started. The X-byte shifter 2070 outputs signal (4) acquired by shifting the signal (3) by 8 bytes from a $307^{th}$ timing when a fourth row of the frame is started.

The above-mentioned exemplary embodiments of the present invention are not embodied only by an apparatus and method. Alternatively, the above-mentioned exemplary embodiments may be embodied by a program performing functions that correspond to the configuration of the exemplary embodiments of the present invention, or a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting data of a transmitting apparatus in an optical transport network, comprising:
generating an optical transmission unit frame including an in-band area including a first area to which information data is allocated and a second area to which the information data is not allocated and an out-band area including parity information; and transmitting the data through the optical transmission unit frame.

2. The method of claim 1, wherein:
the second area is a fixed stuff.

3. The method of claim 2, wherein:
the optical transmission unit frame includes a plurality of rows, and
the second area is a 8-byte area positioned at the end of each row.

4. The method of claim 3, wherein:
the number of the plurality of rows is 4 and the size of the second area is 32 bytes.

5. The method of claim 1, wherein:
additional parity information is allocated to the second area.

6. The method of claim 1, wherein:
the generating the optical transmission unit frame includes,
generating the parity information by performing forward error correction (FEC) encoding with respect to the first area.

7. The method of claim 6, wherein:
the generating the parity information includes performing the FEC encoding by using a BCH (Bose, Chaudhuri, and Hocque-nghem) encoder.

8. The method of claim 1, wherein:
the generating the optical transmission unit frame includes,
generating the in-band area including the first area and the second area;
generating first parity data by encoding the first area;
adding the first parity data section after the first area and the second area; and
generating second parity data by encoding the first area, the second area, and the section including the first parity data or re-encoding the first area,
wherein the parity information includes the first parity data and the second parity data.

9. The method of claim 1, wherein:
the generating the optical transmission unit frame includes,
generating the in-band area including the first area and the second area;
generating first parity data by encoding the first area;
generating second parity data by encoding the first area and the section including the first parity data; and
adding the first parity data section and the second parity data section after the first area and the second area,
wherein the parity information includes the first parity data and the second parity data.

10. The method of claim 1, wherein:
the generating the optical transmission unit frame includes,
generating the in-band area including the first area and the second area
generating first parity data by encoding the first area; and
generating second parity data by encoding the first area and the section including the first parity data or re-encoding the first area,
wherein the parity information includes some of the first parity data and the second parity data, and
the rest of the first parity data is allocated to the second area.

11. The method of claim 1, wherein:
the generating the optical transmission unit frame includes,
mapping the information data to the first area,
wherein the information data includes any one of a plurality of tributary signals, an Ethernet signal, a generic framing procedure (GFP) signal, a pseudo random bit sequence (PRBS) test signal, and a certain client signal.

12. The method of claim 11, wherein:
the mapping the information unit includes,
setting a part of the first area as a fixed stuff when a bit rate of the information data is lower than a bit rate of the first area.

13. The method of claim 1, wherein:
the generating the optical transmission unit frame includes,
dividing the first area into a plurality of tributary slots; and
mapping a plurality of tributary signals to the plurality of tributary slots, respectively, and
the transmitting the data includes,
transmitting the plurality of tributary signals through the plurality of tributary slots in a time-division multiplexing scheme.

14. A method for receiving data of a receiving apparatus in an optical transport network, comprising:
generating an optical transmission unit frame including an in-band area including a first area including information data and a second area to which the information data is not allocated and an out-band area including parity information; and
performing an error correction of the information data by using the parity information included in the out-band area.

15. The method of claim 14, wherein:
the second area includes additional parity information, and
the performing performs the error correction by further using the additional parity information.

16. A transmitting apparatus in an optical transport network, comprising:
a frame generator generating an optical transmission unit frame including an in-band area including a first area to which information data is allocated and a second area to which the information data is not allocated and an out-band area including parity information;
a mapper mapping the information data to the first area; and
a transmitter transmitting the information data mapped by the mapper.

17. The apparatus of claim 16, wherein:
the optical transmission unit frame has an N-byte parallel structure,
the mapper includes a buffer, a stuff generator, and a selector,
the buffer outputs the information data by the N bytes,
the stuff generator generates a stuff of the N bytes, and
the selector selects any one of the outputted information data and the generated stuff.

18. The apparatus of claim 17, wherein:
the mapper further includes a byte shifter shifting the outputted information data by certain bytes.

19. The apparatus of claim 16, wherein:
a fixed stuff is allocated to the second area.

20. The apparatus of claim 16, wherein:
additional parity information is allocated to the second area.

* * * * *